(12) United States Patent
Craig et al.

(10) Patent No.: US 12,221,235 B2
(45) Date of Patent: Feb. 11, 2025

(54) CUBE SATELLITE SPACE DEPLOYER SYSTEM AND METHOD

(71) Applicant: Sidus Space, Inc., Merritt Island, FL (US)

(72) Inventors: Carol Craig, Merritt Island, FL (US); Ryan Jeffrey, Cape Canaveral, FL (US); Anthony Boschi, Merritt Island, FL (US)

(73) Assignee: SIDUS SPACE, INC., Merrit Island, FL (US)

( * ) Notice: Subject to any disclaimer, the term of this patent is extended or adjusted under 35 U.S.C. 154(b) by 219 days.

(21) Appl. No.: 18/048,312

(22) Filed: Oct. 20, 2022

(65) Prior Publication Data

US 2024/0253825 A1  Aug. 1, 2024

(51) Int. Cl.
  *B64G 1/64*  (2006.01)
  *B64G 1/10*  (2006.01)
  *H04L 67/12*  (2022.01)

(52) U.S. Cl.
  CPC ............... *B64G 1/644* (2023.08); *B64G 1/10* (2013.01); *H04L 67/12* (2013.01)

(58) Field of Classification Search
  CPC .............................. B64G 1/643; B64G 1/644
  See application file for complete search history.

(56) References Cited

U.S. PATENT DOCUMENTS

| | | | |
|---|---|---|---|
| 5,199,672 A * | 4/1993 | King | B64G 1/6457 244/164 |
| 9,415,883 B2 * | 8/2016 | Holemans | B64G 1/641 |
| 9,463,882 B1 * | 10/2016 | Field | B64G 1/644 |
| 9,567,115 B2 * | 2/2017 | Dube | B64G 1/641 |
| 9,718,565 B1 * | 8/2017 | Lim | B64G 1/641 |
| 10,538,348 B2 * | 1/2020 | Riskas | B64G 1/641 |
| 10,683,108 B2 * | 6/2020 | Lim | B64G 1/641 |
| 11,588,221 B1 * | 2/2023 | Ray | H01Q 11/08 |
| 11,932,425 B2 * | 3/2024 | Lim | B64G 1/641 |
| 2014/0319283 A1 * | 10/2014 | Holemans | B64G 1/641 244/173.3 |
| 2016/0031572 A1 * | 2/2016 | Dube | B64G 1/641 244/173.1 |
| 2017/0174368 A1 * | 6/2017 | Dube | B64G 1/641 |
| 2017/0327252 A1 * | 11/2017 | Lim | B64G 1/644 |
| 2018/0170586 A1 * | 6/2018 | Riskas | B64G 1/10 |
| 2020/0307834 A1 * | 10/2020 | Lim | B64G 1/644 |
| 2021/0163155 A1 * | 6/2021 | Beck | E05F 3/20 |

* cited by examiner

*Primary Examiner* — Philip J Bonzell
(74) *Attorney, Agent, or Firm* — Mark Malek; Widerman Malek, PL

(57) ABSTRACT

A cube satellite deployer system having a body plate, a communication unit, a power unit, and a control unit. The body plate is adapted to be connected to a space arm assembly. The communication unit and the power unit are attached to the body plate. Each of the communication unit, power unit, and the control unit are in communication with one another. The body plate is also adapted to receive one or more cube satellite housings. The cube satellite housings are adapted to house and selectively launch one or more of the cube satellites that are housed by the cube satellite housings.

36 Claims, 13 Drawing Sheets

CUBE SATELLITE SPACE DEPLOYER SYSTEM AND METHOD

FIELD OF THE INVENTION

The present invention relates to systems and methods for devices used to deploy cube satellites in space by adapting one or more cube satellite launchers to be handled by a robotic arm assembly.

BACKGROUND OF THE INVENTION

There is a need within the communities that utilize satellites and cube satellites to conduct research, experiments, communications, data gathering, and/or monitoring in or from space. There is a need to be able to conduct these operations by a time efficient and cost-effective option rather than design and launch one's own cube satellite into space, or to paying another to design and launch a cube satellite into space. This creates a need for a satellite that an individual or company can use in a cost effective and time efficient manner that is made readily available.

Traditionally for an individual to obtain the use of a cube satellite in space would have to either create and launch the individual's own cube satellite, pay another company or organization to create and/or launch a cube satellite for the individual, or pay to obtain access to another's cube satellite. However, all of these options are either time consuming, monetarily taxing, or both. Especially if the individual does not need a satellite that is operational for an extended period of time.

In light of the above deficiencies in the prior art, a solution is needed that provides a cube satellite deployer for an individual so that the individual can obtain and use a cube satellite within a short period of time that is readily available, accessible to those who require a cube satellite, and at a reasonable cost without having to develop or launch one's own cube satellite or paying another to. In line with this solution, another solution is needed to utilize and adapt the devices and technology that are already being implemented in order to reduce the costs and turnover times of providing the cube satellites. The solution must be such that the devices and technology already in use require little to no changes or adaptations to implement the cube satellite launcher, as the cube satellite launcher should be adapted to function with the devices and technology already in use.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

The present invention addresses the deficiencies in the prior art by provided a cube satellite space deployer that is adapted to function with and use the devices and technology presently being used in space so that cube satellites can be launched in space at greatly reduced cost and increased accessibility to individuals desiring to use or have a cube satellite in the orbit of Earth. This is largely done by adapting various cube satellite launchers to be attached to an adapter plate that in turn attaches to a space arm assembly, such as the space arm assembly being used on the International Space Station (ISS). Thus, the assembled launcher(s) and adapter are carried into space as cargo destined for the ISS where the launcher(s) and adapter are then connected to the space arm assembly for the cube satellites to then be launched into orbit. The adapter includes the necessary or required components and devices to function with the launchers and the space arm assembly. However, the adapter plate is not limited to function only with select or particular cube satellite launchers or space arm assemblies.

With the above in mind, embodiments of the present invention are related to a cube satellite deployer system that may include a body plate, a communication unit, a power unit, and a control unit. The body plate may be adapted to be connected to a space arm assembly. The communication unit may be attached to the body plate. The power unit may be in communication with the communication unit and may be attached to the body plate. The control unit may be in communication with the communication unit and/or the power unit.

The body plate may be adapted to receive at least one cube satellite housing. The cube satellite housing(s) may be adapted to house at least one cube satellite. The cube satellite housing(s) may also be adapted to selectively launch at least one cube satellite. The system may include the cube satellite housing(s) being connectable to the body plate. The cube satellite housing(s) may also be in communication with the communication unit, the power unit, and/or the control unit.

The system may further include the cube satellite(s) being selectively launchable from the cube satellite housing(s) via a propellant, a spring, an electromagnet, a roller, a pneumatic device, a robotic arm, a hydraulic device, a pressurized medium, a pulley, and/or a kinetic pusher. The system may yet further include the power unit comprising a power storage unit, a power generation unit, and/or a power connection adapter. The power connection adapter may be in communication with the space arm assembly.

The system may include the power unit comprising a battery, a photovoltaic member, and/or a fuel consuming generator. The system may further include a guidance unit that may be attached to the body plate. The guidance unit may be in communication with the communication unit, the power unit, and/or the control unit. The system may yet further include the guidance unit comprising a global positioning device, a star tracker, a magnetometer, an accelerometer, an atomic clock, an inertial tracker, a horizon tracker, and/or a sun tracker. The system may include the cube satellite(s) being sized between 3 U to 12 U.

The system may further include the communication unit comprising a radio device, an antenna, a communication dish, a transmitter, a receiver, and/or a transceiver. The system may yet further include the communication unit being in communication with a communication device. The system may include the communication unit being in communication with the communication device via a network.

The system may further include one or more attitude unit(s) that may be attached to the body plate. The attitude unit(s) may be in communication with the communication unit, the control unit, and/or the power unit. The system may yet further include the attitude unit(s) comprising a reaction control wheel, a thruster, a solar sail, a gyroscope, and/or a magnetic torquer.

In another embodiment of the present invention, the system may include the body plate being removably connectable to the space arm assembly so that the body plate may be deployed from the space arm assembly and may propel and orient itself, and so that the body plate may be reattached to the space arm assembly.

In yet another embodiment of the present invention, the system may include the body plate being removably connected to the space arm assembly. The body plate may be deployable from the space arm assembly. The body plate may also be adapted to propel and orient itself upon being deployed from the space arm assembly. The body plate may be further adapted to be reattached to the space arm assembly.

An embodiment of the present invention may include a method for using a cube satellite deployer. The cube satellite deployer may include a body plate, a communication unit, a control unit, and a power unit. The body plate may be adapted to be removably connected to a space arm assembly. The communication unit and the power unit may each be attached to the body plate. The communication unit, power unit, and the control unit may each be in communication with one another.

The method may include a step of attaching one or more cube satellite housing(s) to the body plate. The cube satellite housing(s) may be adapted to house one or more cube satellites, and the cube satellite housing(s) may also be positioned in communication with the communication unit, power unit, and the control unit.

The method may further include a step connecting the body plate to the space arm assembly, and the method may yet further include deploying one or more cube satellites into space from the cube satellite housing(s) when the cube satellite housing(s) are connected to the body plate. The body plate may be deployable from the space arm assembly, and the body plate may be adapted to propel and orient itself upon deployment from the space arm assembly. The body plate also may be further adapted to be reattached to the space arm assembly.

The step of deploying one or more of the cube satellites into space may further include deploying the cube satellite(s) into space using a propellant, a spring, an electromagnet, a roller, a pneumatic device, a robotic arm, a hydraulic device, a pressurized medium, a pulley, and/or a kinetic pusher. The power unit may include a power storage unit, a power generation unit, and/or a power connection adapter. The power unit may also include one or more of a battery, a photovoltaic member, and a fuel consuming generator. The power connection adapter may be in communication with the space arm assembly.

The cube satellite deployer may further include a guidance unit and one or more attitude units. The guidance unit and the attitude unit(s) may be attached to the body plate. Also, the guidance unit and the attitude unit(s) may each be in communication with one or more of the communication unit, the power unit, and the control unit.

The guidance unit may include a global positioning device, a star tracker, a magnetometer, an accelerometer, an atomic clock, an inertial tracker, a horizon tracker, and/or a sun tracker. The attitude unit may include a reaction control wheel, one or more thrusters, one or more solar sails, a gyroscope, and/or a magnetic torquer. The cube satellites may be sizes between 3 U and 12 U. The communication unit may include one or more of a radio device, an antenna, a communication dish, a transmitter, a receiver, and/or a transceiver.

BRIEF DESCRIPTION OF THE DRAWINGS

Some embodiments of the present invention are illustrated as an example and are not limited by the figures of the accompanying drawings, in which like references may indicate similar elements.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

An embodiment of the invention, as shown and described by the various figures and accompanying text, provides for a cube satellite deployer system 1000 that may house a payload of one or more cube satellites 1008. The cube satellites 1008 may vary in size, and may be carried into or within space and be launched by the system 1000.

Figure 1:
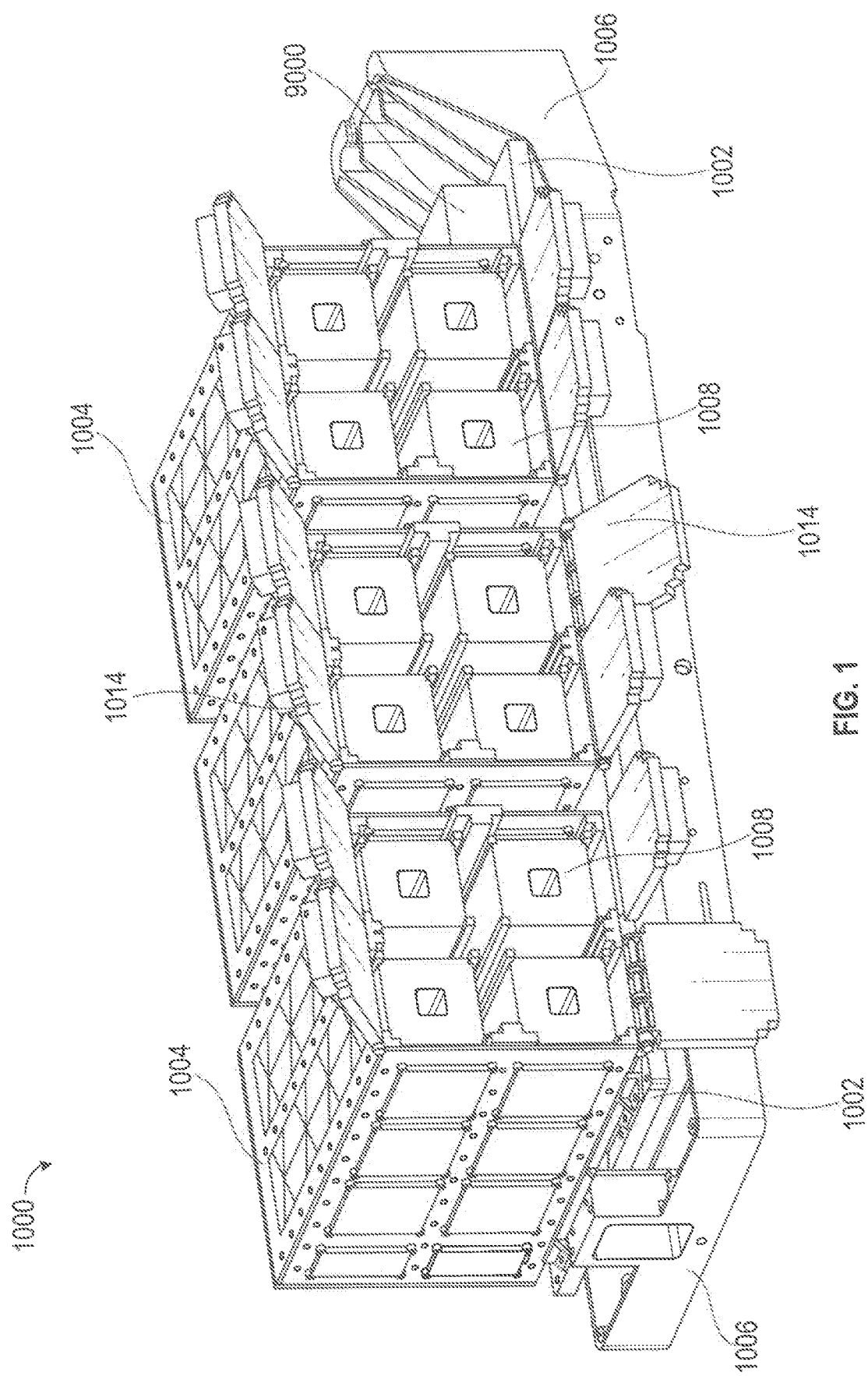
FIG. 1 is a perspective view of a cube satellite space deployer system according to an embodiment of the present invention, showing the body plate attached to a space arm assembly.
Figure 2:
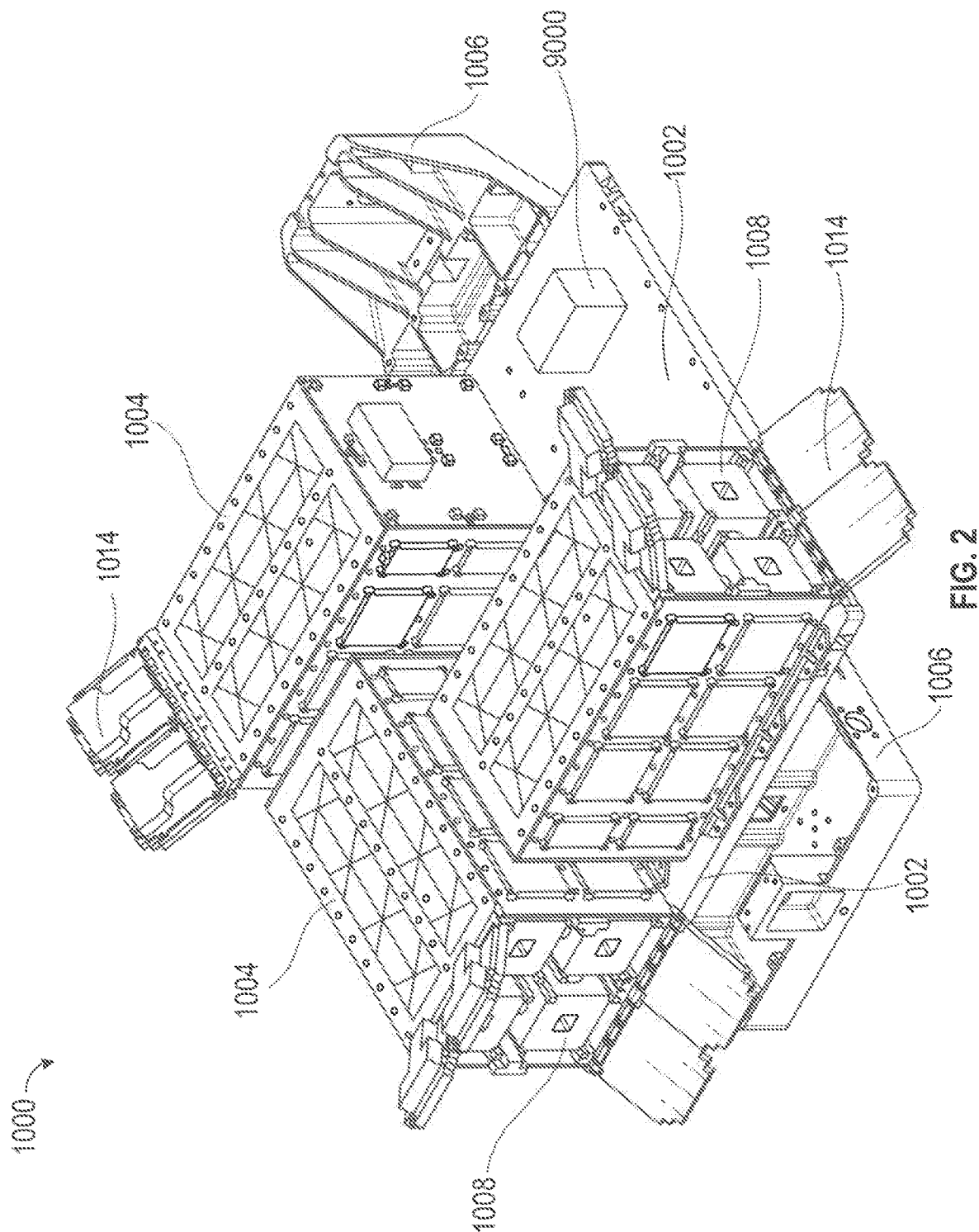
FIG. 2 is another perspective view of a cube satellite space deployer system according to an embodiment of the present invention, showing a large body plate with cube satellite housings attached in multiple configurations.
Figure 3:
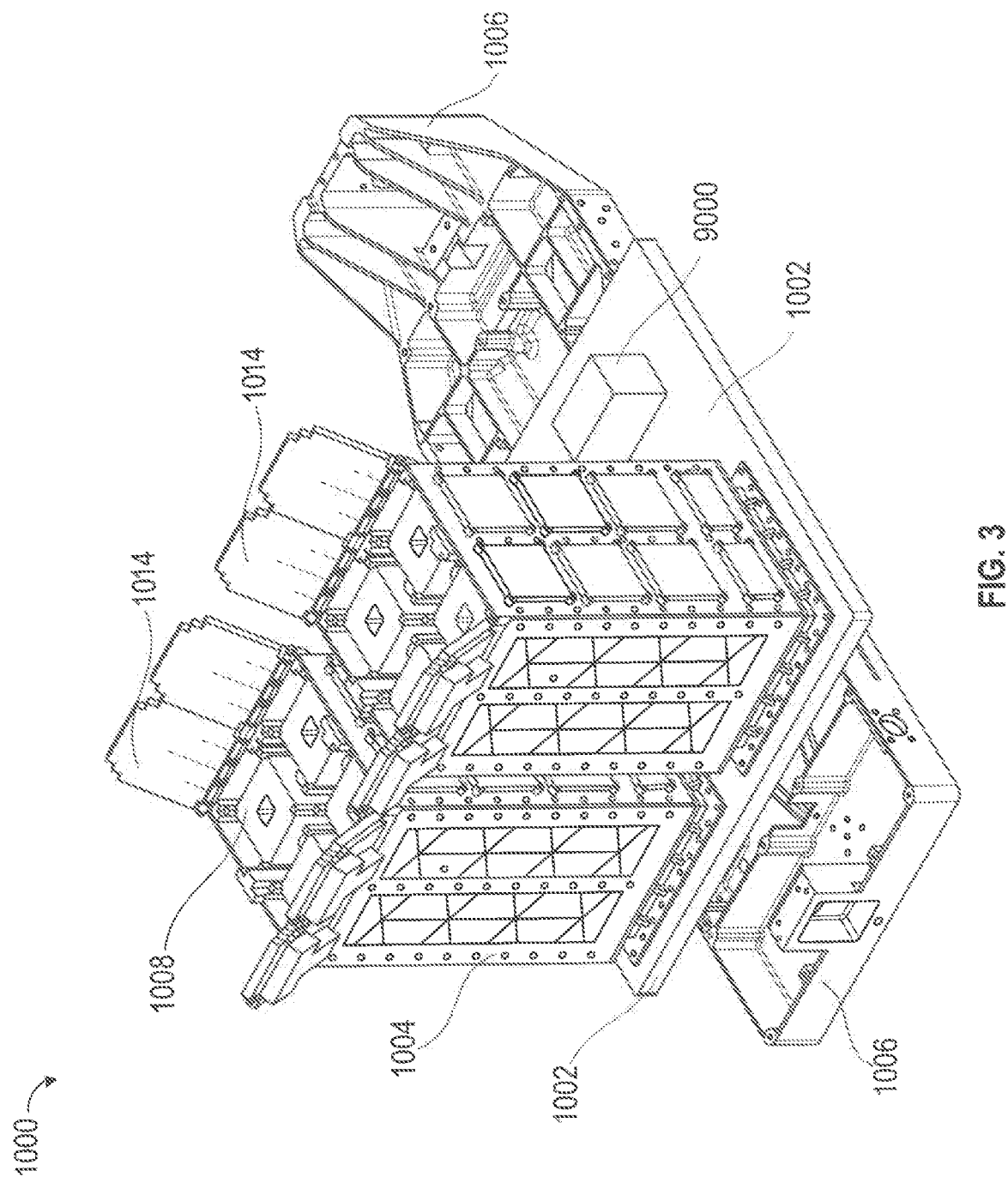
FIG. 3 is another perspective view of the cube satellite space deployer system of FIG. 2, showing two cube satellite housings in an upright configuration with the housing covers of the cube satellite housings in the open position.
Figure 4:
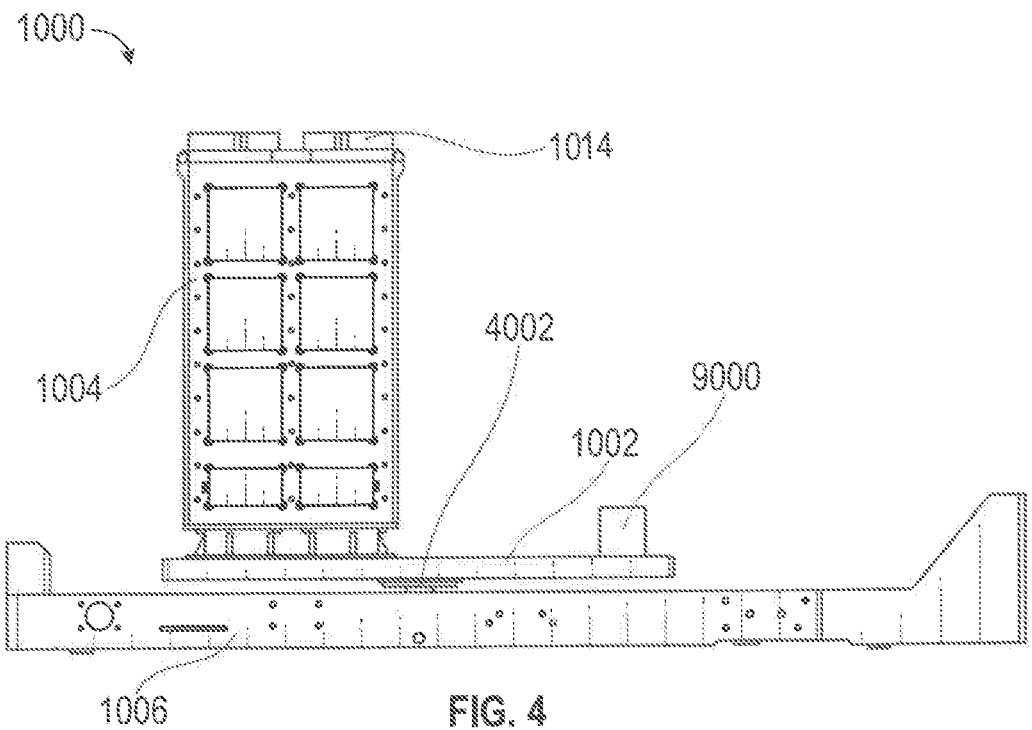
FIG. 4 is a side elevation view of the cube satellite space deployer system of FIG. 3, showing the housing covers in the closed position.
Figure 8:
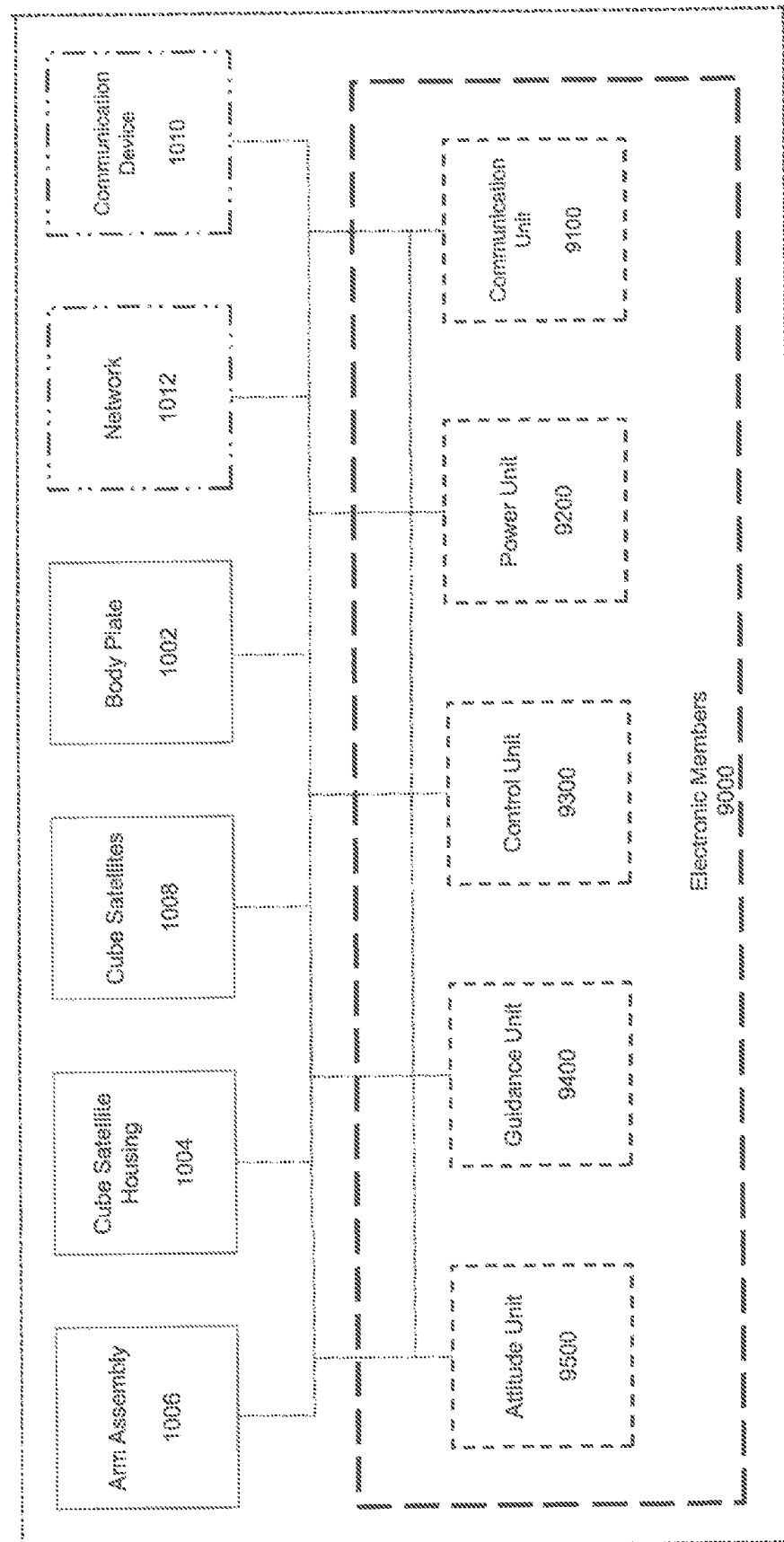
FIG. 8 is a schematic diagram of components of a cube satellite space deployer system according to an embodiment of the present invention.

Initially referring to FIGS. 1, 4, and 8, the system 1000 may include a body plate 1002, one or more cube satellite housings 1004, and electronic members 9000. The body plate 1002 may be adapted to be connected and/or removably connected to a space arm assembly 1006. The body plate 1002 may also be connected and/or removable connected to the space arm assembly 1006 via an attachment member 4002. The attachment member 4002 may be controllable to attach and/or detach to/from the space arm assembly 1006, or the space arm assembly 1006 may be controllable to attach and/or detach to/from the attachment member 4002.

The body plate 1002 may be adapted to carry, receive, hold, and/or be attached to the one or more cube satellite housings 1004. The cube satellite housing(s) 1004 may be adapted to be connectable to the body plate 1002. The cube satellite housings 1004 may be positioned on the body plate 1002 in a number of different configurations. As best illustrated in FIGS. 1-3 and 6-7, the cube satellite housings 1004 may be attached to the body plate 1002 on a side surface of the cube satellite housing 1004 and/or a first end of the cube satellite housing 1004 that is opposite of a second end of the cube satellite housing 1004. The cube satellite housings 1004 may also vary in size as illustratively shown in FIG. 6. The second end of the cube satellite housing 1004 may include a housing cover 1014 hingedly connected to the cube satellite housing 1004 that may be controllable to move between a closed position and an open position.

The closed position may be defined as when the housing cover 1014 is positioned to cover cube satellites 1008 housed by the cube satellite housing 1004. The open position may be defined as when the housing cover 1014 is positioned to not cover the cube satellites 1008 housed by the cube satellite housing 1004 and may allow for the cube satellites 1008 to travel out from or into the cube satellite housing 1004 without coming into contact with the housing cover 1014. The open position may also be defined as when the housing cover(s) 1014 are positioned such that a substantial amount of the interior of the cube satellite housing(s) 1004 and the cube satellites 1008 that may be carried therein are exposed.

Figure 9:
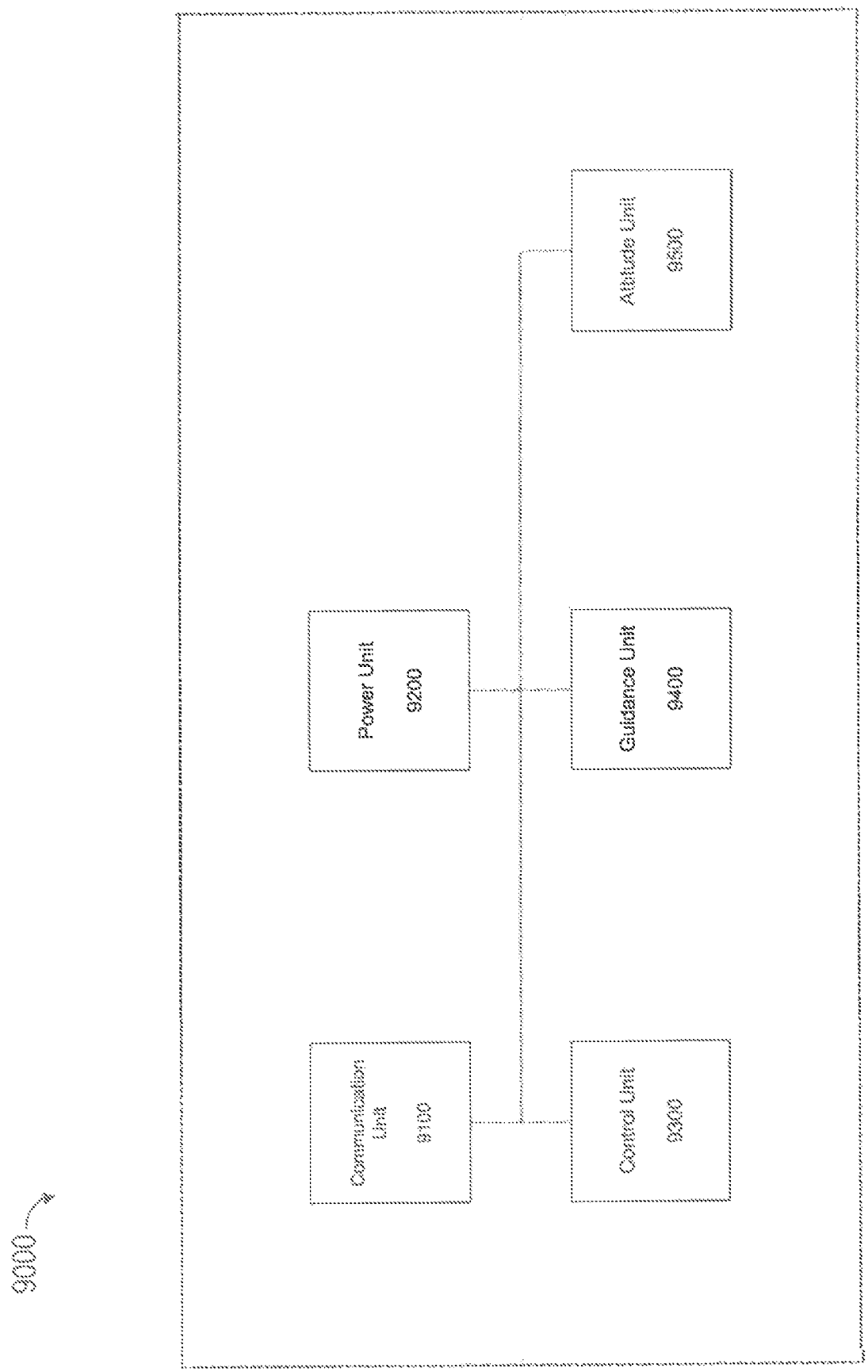
FIG. 9 is a schematic diagram of the electronic members of the cube satellite space deployer system according to FIG. 8.

Now specifically referring to FIG. 8, and additionally referring to FIG. 9, the electronic members 9000 may include a communication unit 9100, a power unit 9200, a control unit 9300, a guidance unit 9400, and an attitude unit 9500. For the purposes of the present invention, the electronic members 9000 may, without limitation, refer to the communication unit 9100, the power unit 9200, the control unit 9300, the guidance unit 9400, and the attitude unit 9500, separately, in combination, or in any combination thereof. The electronic members 9000 may be positioned and/or attached to a surface of the body plate 1002. The electronic members 9000 may include one or more housings that may contain, carry, and/or house one or more of the communication unit 9100, the power unit 9200, the control unit 9300, the guidance unit 9400, and the attitude unit 9500.

The electronic members 9000 may be in communication with the attachment member 4002, housing cover 1014 of the cube satellite housing(s) 1004, the space arm assembly 1006, the cube satellite housing(s) 1004, the body plate 1002, a network 1012, and a communication device 1010. The communication unit 9100, power unit 9200, control unit 9300, guidance unit 9400, and the attitude unit 9500 may be in communication with the same devices, components, and/or members as recited for the electronic members 9000 herein.

The network 1012 may comprise of any wired or wireless communication device or devices that may be used to facilitate communication of computer readable code, instructions, communication, data, and/or information as understood by those skilled in the art. For example, without limitation, the network 1012 may include and/or use cable, ethernet, fiberoptics, radio, Wi-Fi, Bluetooth, microwaves, infrared waves, satellites, antennas, communication hubs, datacenters, servers, personal computers, mobile phones, routers, end devices, and any other device as understood by those skilled in that art that may be used for and/or as the network 1012 to facilitate communication of computer readable code, instructions, communication, data, and/or information.

The communication device 1010 may be in communication with the electronic members 9000, the attachment member 4002, housing covers 1014 of the cube satellite housing(s) 1004, the space arm assembly 1006, the cube satellite housing(s) 1004, the body plate 1002, and the network 1012. The communication device 1010 may be, via the network 1012, in communication with the electronic members 9000, the attachment member 4002, the housing cover 1014 of the cube satellite housing(s) 1004, the space arm assembly 1006, the cube satellite housing(s) 1004, and the body plate 1002. The communication device 1010 may include, without limitation, personal computers, tablets, mobile phones, terminals, servers, datacenters, and databases. The communication device 1010 may be used to control, manage, operate, and/or monitor the electronic members 9000, the attachment member 4002, the housing cover 1014 of the cube satellite housing(s) 1004, the space arm assembly 1006, the cube satellite housing(s) 1004, the body plate 1002, and send and/or receive computer readable information, instructions, code, or data therefrom.

Now referring to FIGS. 1-3 and 6, the cube satellites 1008 may be carried by the cube satellite housings 1004. The cube satellites 1008 may include cube satellites of sizes 3 U to 12 U. For the purposes of the present invention, 1 U is equal to ten cubic centimeters ($10\ cm^3$). Thus, 3 U is thirty cubic centimeters ($30\ cm^3$), and 12 U is a hundred twenty cubic centimeters ($120\ cm^3$). The cube satellite housings 1004 may be adapted to launch or selectively launch the cube satellites 1008 from the cube satellite housing 1004 via one or more of a propellant, a spring, an electromagnet, a roller, a pneumatic device, a robotic arm, a hydraulic device, a pressurized medium, a pulley, and a kinetic pusher.

The cube satellite housings 1004 may also be adapted to capture cube satellites 1008 that will then be carried by the cube satellite housing 1004. The cube satellite housings 1004 may also be adapted to conduct a damage assessment and/or repairs on the cube satellites 1008 that are housed and/or carried by the cube satellite housing 1004.

Figure 7:
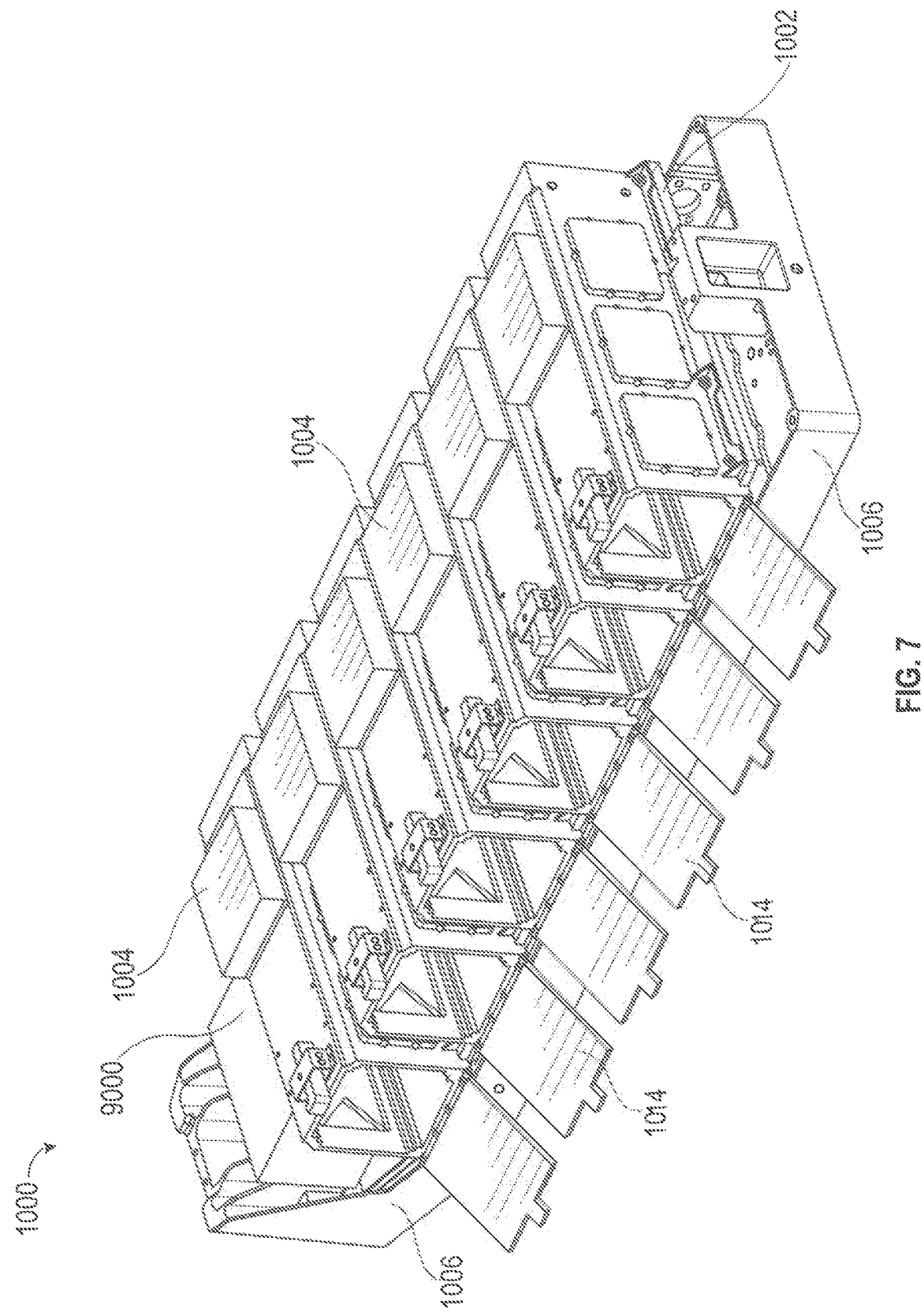
FIG. 7 is a perspective view of a cube satellite space deployer system according to an embodiment of the present invention, showing a small body plate with a plurality of small cube satellite housings thereon.

Now additionally referring to FIGS. 4 and 7, the space arm assembly 1006, as mentioned above, may be adapted to be connected, connectable, and/or removably attached to the body member 1002 on a first surface that may be opposite a second surface that the cube satellite housing(s) 1004 may be attached thereto. The space arm assembly 1006 may also be attached to the body plate 1002 via the attachment member 4002. The space arm assembly 1006 may be a part of and/or attached to a robotic space arm (not shown). The robotic space arm may be operable by a user to control the movement and/or operation of the robotic space arm. The space arm assembly 1006 may be adapted to maintain attachment with the body plate 1002 and/or attachment member 4002, release and/or remove attachment with the body plate 1002 or attachment member 4002, and/or launch the body plate 1002 or attachment member 4002 after releasing the body plate 1002 and/or attachment member 4002 by applying a force against the body member 1002 and/or attachment member 4002.

Figure 10:
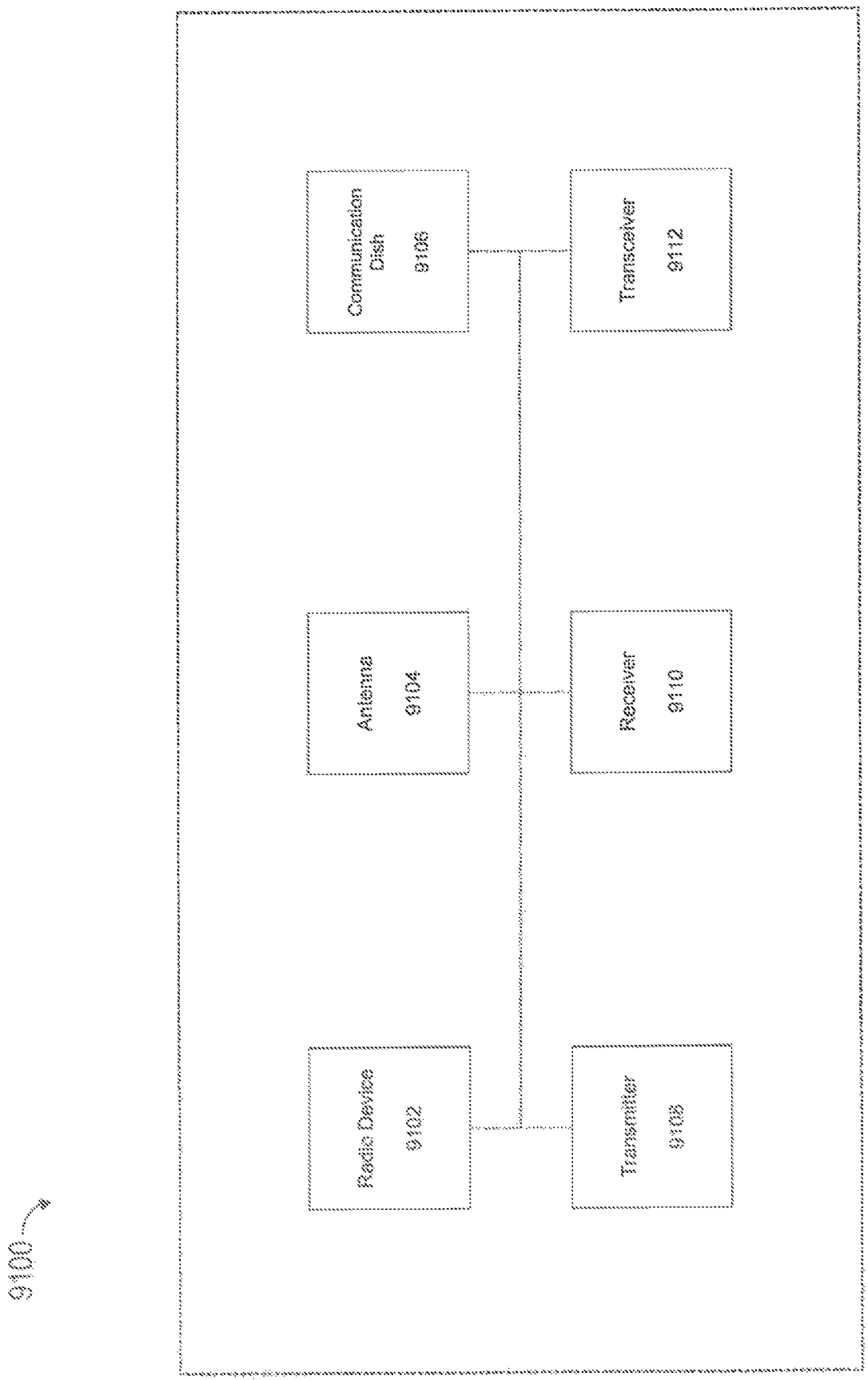
FIG. 10 is a schematic diagram of the communication unit of the cube satellite space deployer system according to FIG. 8.

Now referring to FIGS. 8-10, the communication unit 9100 may be in communication with the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the power unit 9200, the control unit 9300, the guidance unit 9400, and the attitude unit 9500. The communication unit 9100 may be in communication with the communication device 1010 via the network 1012. The communication unit 9400 may be attached to the body plate 1002. The communication unit 9100 may be configured to facilitate, send, receive, process, interpret, convert, and/or read, computer readable information in digital or analog format to and/or from the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the power unit 9200, the control unit 9300, the guidance unit 9400, and the attitude unit 9500.

The communication unit 9100 may include a radio device 9102, an antenna 9104, a communication dish 9106, a transmitter 9108, a receiver 9110, and/or a transceiver 9112. The radio device 9102, the antenna 9104, the communication dish 9106, the transmitter 9108, the receiver 9110, and the transceiver 9112 may be in communication with the same devices, components, and/or members as recited for the communication unit 9100 herein.

The radio device 9102 may be, without limitation, in communication with the antenna 9104, the communication dish 9106, the transmitter 9108, the receiver 9110, and/or the transceiver 9112. The radio device 9102 may be adapted to facilitate, send, receive, process, interpret, convert, and/or read, computer readable information in digital or analog format to and/or from the network 1012 and/or the communication device 1010. The antenna 9104 may be adapted to facilitate, send, receive, computer readable information that is transmitted and/or received via a variety of computer readable information formats. For example, without limitation, radio waves, microwaves, infrared waves, visible light, electromagnetic waves, Wi-Fi, Bluetooth, Cellular data, X-ray, and/or gamma rays. The antenna 9104 may comprise of, without limitation, a wire antenna, aperture antenna, reflector antenna, lens antenna, micro strip antenna, array antenna or any other antenna as understood by those skilled in the art.

The communication dish 9106 may be, without limitation, in communication with the antenna 9104, the radio device 9102, the transmitter 9108, the receiver 9110, and/or the transceiver 9112. The communication dish 9106 may be adapted to facilitate, send, receive, process, interpret, convert, and/or read, computer readable information in digital or analog format to and/or from the network 1012 and/or the communication device 1010. The antenna 9104 may be adapted to facilitate, send, receive, computer readable information that is transmitted and/or received via a variety of computer readable information formats. For example, without limitation, radio waves, microwaves, infrared waves, visible light, electromagnetic waves, Wi-Fi, Bluetooth, Cellular data, X-ray, and/or gamma rays. The communication dish 9106 may comprise of, without limitation, a motor-driven dish, very small aperture terminal (VAST) dish, automatic tracking dish, parabolic dish, or any other communication dish as understood by those skilled in the art.

The transmitter 9108 may be, without limitation, in communication with the antenna 9104, the communication dish 9106, the radio device 9102, the receiver 9110, and/or the transceiver 9112. The transmitter 9108 may be adapted to generate computer readable radio waves from signals that may be received from the power unit 9200, the control unit 9300, the guidance unit 9400, the attitude unit 9500, space arm assembly 1006, cube satellite housing 1004, cube satellites 1008, body plate 1002, the network 1012, and the communication device 1010. The transmitter 9108 may be adapted to generate the computer readable radio waves to be emitted via the antenna 9104.

The receiver 9110 may be, without limitation, in communication with the antenna 9104, the communication dish 9106, the radio device 9102, the transmitter 9108, and/or the transceiver 9112. The receiver 9110 may be adapted to read, interpret, amplify, correct, clarify, receive, compute, and/or convert signals that are sent to the receiver 9110 via the network 1012 and/or from a communication device 1010. The receiver 9110 may also be configured to read signals of various types. For example, without limitation, radio wave signals. The receiver 9110 may comprise of a tuned radio receiver, regenerative receiver, super regenerative receiver, super-heterodyne receiver, direct conversion receiver, and/or any other receiver as understood by those skilled in the art that may be used as the receiver 9110.

The transceiver 9112 may be, without limitation, in communication with the antenna 9104, the communication dish 9106, the radio device 9102, the transmitter 9108, and/or the receiver 9110. The transceiver 9112 may be adapted to act as a combination of both the transmitter 9108 and the receiver 9110 with the same or similar functionality that each the transmitter 9108 and the receiver 9110 have been defined above. The transceiver 9112 may be adapted to generate computer readable radio waves from signals received from the power unit 9200, control unit 9300, guidance unit 9400, attitude unit, space arm assembly 1006, cube satellite housing 1004, cube satellites 1008, body plate 1002, the network 1012, and the communication device 1010. The computer readable radio waves generated by the transceiver 9112 may be sent and/or emitted via the antenna 9104.

The transceiver 9112 may also be adapted to read, interpret, amplify, correct, clarify, receive, compute, and/or convert signals that are sent to or received by the transceiver 9112 via the network 1012 and/or a communication device 1010. Furthermore, the transceiver 9112 may be adapted to receive signals as well as generate and/or send signals. The signals sent and/or received by the transceiver 9112 may be via radio wave, infrared, ethernet, fiber optic, and/or any other signal type as understood by those skilled in the art.

Figure 11:
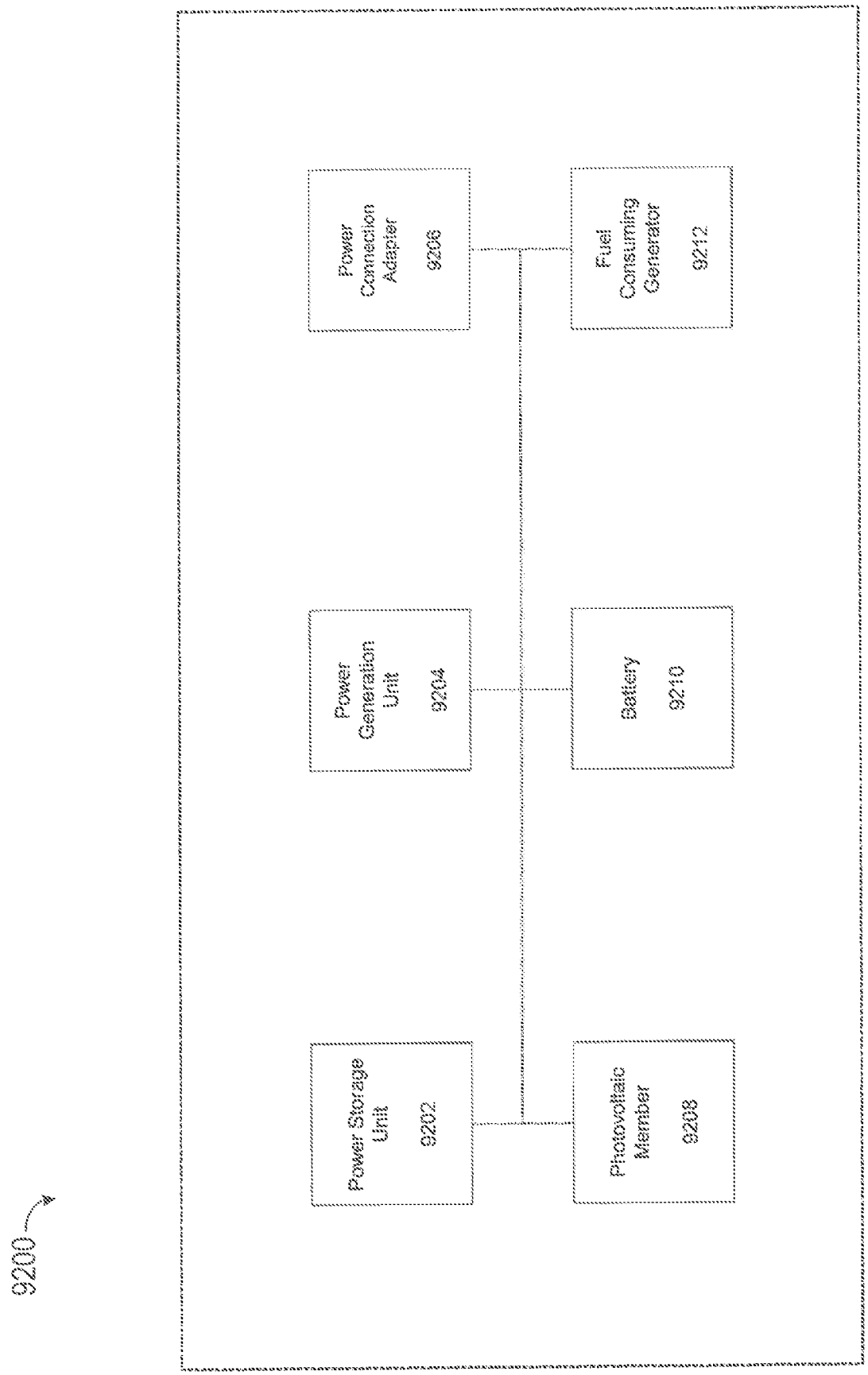
FIG. 11 is a schematic diagram of the power unit of the cube satellite space deployer system according to FIG. 8.

Continuing to refer to FIGS. 8-9, and additionally referring to FIG. 11, the power unit 9200 may be in communication with the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the control unit 9300, the guidance unit 9400, and the attitude unit 9500. The power unit 9200 may be adapted to store, generate, supply, regulate, and/or monitor electric power supplied, used, consumed, and/or generated by the power unit 9200, the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the control unit 9300, the guidance unit 9400, and/or the attitude unit 9500. The power unit 9200 may include, without limitation, a transformer, rectifier, signal generator, voltage controller, amperage controller, computation device, circuit breakers, fuses, and/or any other component for power control, supply, and/or regulation as understood by those skilled in the art.

The power unit 9200 may include a power storage unit 9202, a power generation unit 9204, a power connection adapter 9206, a photovoltaic member 9208, a battery 9210, and/or a fuel consuming generator 9212. The power storage unit 9202, the power generation unit 9204, the power connection adapter 9206, the photovoltaic member 9208, the battery 9210, and the fuel consuming generator may be in communication with the same devices, components, and/or members as recited for the power unit 9200 herein.

The power storage unit 9202 may be, without limitation, in communication with the power generation unit 9204, the power connection adapter 9206, the photovoltaic member 9208, the battery 9210, and the fuel consuming generator 9212. The power storage unit 9202 may be adapted to monitor, regulate, supply, and/or store electric power to be used by the system 1000. Specifically, the electric power to the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the control unit 9300, the guidance unit 9400, and/or the attitude unit 9500.

The power storage unit 9202 may comprise of various components, mediums, and devices for power storage and distribution. For example, without limitation, the mediums stored power in the power storage unit 9202 may include a consumable fuel, a chemically stored energy, and/or a kinetically stored energy. The power storage unit 9202 may be in communication with, and store electric power received from, the power generation unit 9204, the power connection adapter 9206, the photovoltaic member 9208, and/or the fuel consuming generator 9212. More details on the power generation unit 9204, the power connection adapter 9206, the photovoltaic member 9208, and the fuel consuming generator 9212 follows below.

The power generation unit 9204 may be, without limitation, in communication with the power storage unit 9202, the power connection adapter 9206, the photovoltaic member 9208, the battery 9210, and the fuel consuming generator 9212. The power generation unit 9204 may be adapted to monitor, regulate, supply, and/or generate electric power to be used by the system 1000. Specifically, the electric power to be used by the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the control unit 9300, the guidance unit 9400, and/or the attitude unit 9500. The power generation unit 9204 may comprise of a combustion generator, renewable energy source electrical power generator, and/or a non-renewable energy source electrical power generator.

The power connection adapter 9206 may be, without limitation, in communication with the power generation unit 9204, the power storage unit 9202, the photovoltaic member 9208, the battery 9210, and the fuel consuming generator 9212. The power connection adapter 9206 may be adapted to connect to a power source to supply electric power to be used by the system 1000. Specifically, the electric power to be used by the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the control unit 9300, the guidance unit 9400, and/or the attitude unit 9500.

The power connection adapter 9206 may also be in communication with the space arm assembly 1006, the cube satellite housing 1004, the cube satellites 1008, the body plate 1002, the network 1012, the communication device 1010, the attitude unit 9500, the guidance unit 9400, the control unit 9300, the communication unit 9100, a space station (not shown), a space vehicle (not shown), and/or a satellite (not shown). The power connection adapter 9206 may also be adapted to regulate, control, transform, and/or monitor the electric power received and supplied by the power connection adapter 9206. The power connection adapter 9206 may include, without limitation, a transformer, rectifier, signal generator, voltage controller, amperage controller, computation device, circuit breakers, fuses, and/or any other component for power control, supply, and/or regulation as understood by those skilled in the art.

The photovoltaic member 9208 may be, without limitation, in communication with the power generation unit 9204, the power storage unit 9202, the power connection adapter 9206, the battery 9210, and the fuel consuming generator 9212. The photovoltaic member 9208 may be adapted to generate electric power by capturing and/or transforming one or more wavelengths of light into electric power. The photovoltaic member 9208 may capture and/or transform wavelengths of light including, without limitation, visible light, infrared light, and/or ultraviolet and generate electrical power. The photovoltaic member 9208 may comprise, without limitation, monocrystalline silicon panels, polycrystalline silicon panels, and/or thin film panels.

The battery 9210 may be, without limitation, in communication with the power generation unit 9204, the power storage unit 9202, the power connection adapter 9206, the photovoltaic member 9208, and the fuel consuming generator 9212. The battery 9210 may be adapted to store electrical power. The battery 9210 may also be adapter to supply electrical power to various components including, without limitation, the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the control unit 9300, the guidance unit 9400, and/or the attitude unit 9500.

The battery 9210 may also be adapted to be charge by and/or store electric power received from, the power generation unit 9204, the power connection adapter 9206, the photovoltaic member 9208, and/or the fuel consuming generator 9212. The battery 9210 may comprise, without limitation, lithium batteries, alkaline batteries, carbon zin batteries, silver oxide batteries, zinc air batteries, lithium-ion batteries, nickel cadmium batteries, nickel-metal hydride batteries, and any other battery that may store, supply, and/or is chargeable by electrical power as understood by those skilled in the art.

The fuel consuming generator 9212 may be, without limitation, in communication with the power generation unit 9204, the power storage unit 9202, the power connection adapter 9206, the photovoltaic member 9208, and the battery 9210. The fuel consuming generator 9212 may be adapted to generate electric power by consuming a fuel, with the power being supplied to the system 1000. Specifically, the electric power to be used by the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the control unit 9300, the guidance unit 9400, and/or the attitude unit 9500.

The fuel consuming generator 9212 may be configured to store the fuel, and/or the power storage unit 9202 may be configured to store the fuel. The fuel may comprise, without limitation, diesel, natural gas, propane, radioactive material, and/or any type of fuel source for power generation as understood by those skilled in the art. The fuel consuming generator 9212 may comprise, without limitation, a combustion generator, nuclear generator, and/or a thermal capture generator. The fuel consuming generator 9212 may be configured to generate electrical power in either direct current or alternating current, and may include a rectifier, inverter, and power regulator.

Figure 12:
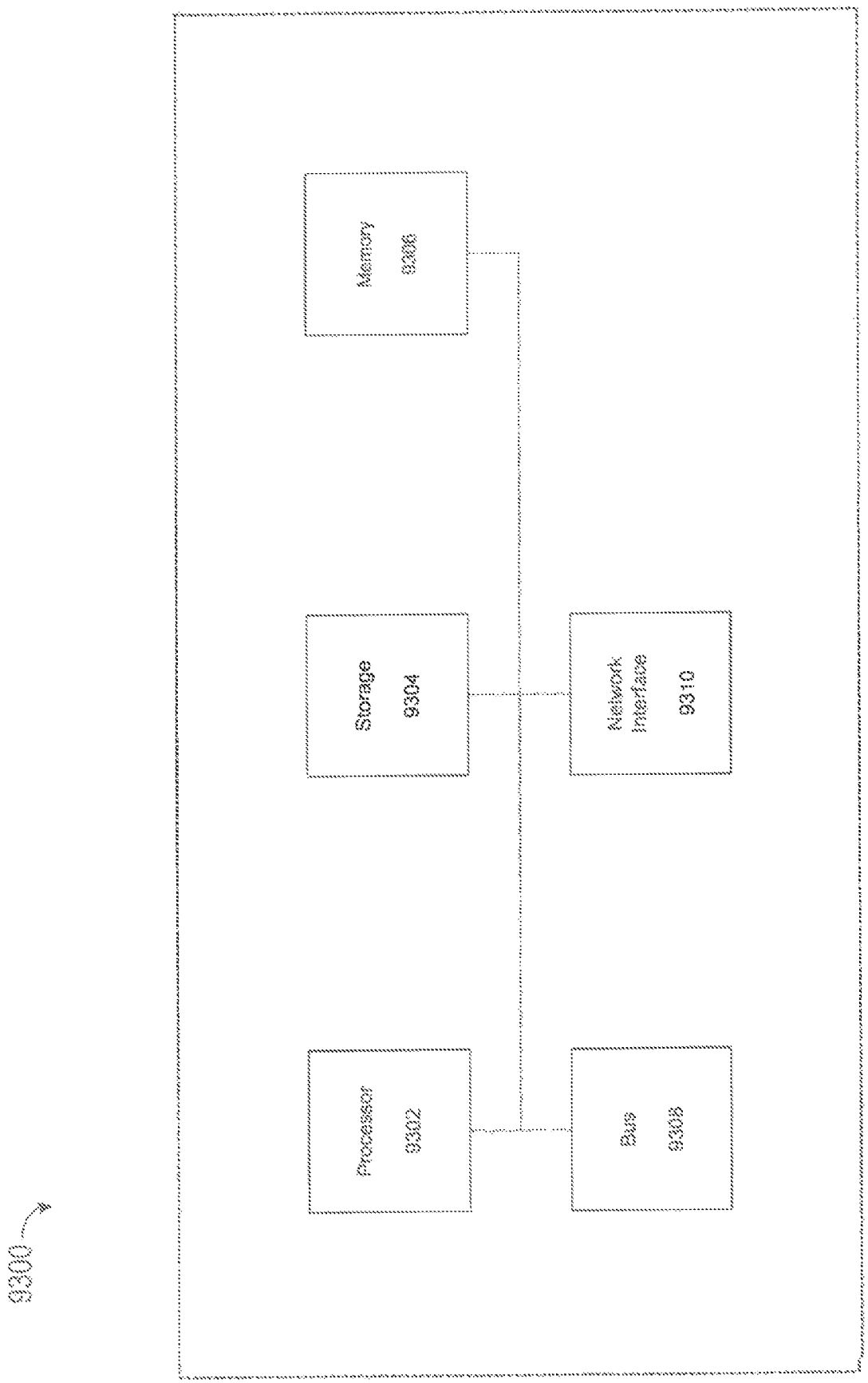
FIG. 12 is a schematic diagram of the control unit of the cube satellite space deployer system according to FIG. 8.

Continuing to refer to FIGS. 8-9, and additionally referring to FIG. 12, the control unit 9300 may be in communication with the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, and the attitude unit 9500. The control unit 9300 may be adapted to compute, process, store, relay, convert, encode, read, write, control, and/or encrypt computer readable instructions, code, data, information, commands, and/or signals that the control unit 9300 receives and/or transmits from and/or to the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, and the attitude unit 9500.

The control unit 9300 may also be adapted to control, monitor, regulate, and/or manage the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, and the attitude unit 9500. The control unit 9300 may include a processor 9302, a storage 9304, a memory 9306, a bus 9308, and a network interface 9310. The processor 9302, the storage 9304, the memory 9306, the bus 9308, and the network interface 9310 may be in communication with the same devices, components, and/or members as recited for the control unit 9300 herein.

The processor 9302 may be in communication with the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, the attitude unit 9500, the storage 9304, the memory 9306, the bus 9308, and the network interface 9310. The processor 9302 may be adapted to compute, process, relay, convert, encode, read, write, control, and/or encrypt computer readable instructions, code, data, information, commands, and/or signals that the processor 9302 receives and/or transmits from and/or to the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, the attitude unit 9500, the storage 9304, the memory 9306, the bus 9308, and the network interface 9310.

The processor 9302 may comprise, without limitation, a central processing unit (CPU), a graphics processing unit (GPU), a microprocessor, microcontroller, embedded processor, a digital signal processor, field programmable gate array (FPGA), and/or any other component that may be used as the processor 9302 to compute computer readable instructions as understood by those skilled in the art.

The storage 9304 may be in communication the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, the attitude unit 9500, the processor 9302, the memory 9306, the bus 9308, and the network interface 9310. The storage 9304 may be adapted to store, read, write, receive, transmit, overwrite, delete, and/or save computer readable information that the storage 9304 carries and/or receives from the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, the attitude unit 9500, the processor 9302, the memory 9306, the bus 9308, and the network interface 9310.

The storage 9304 may comprise, without limitation, non-volatile computer readable memory, volatile computer readable memory, hard drive storage, hard disk storage, floppy disk storage, magnetic tape storage, solid state storage, and/or any other type of device or component to be used as the storage 9302 as understood by those skilled in the art to store computer readable instructions, code, data, and/or information.

The memory 9306 may be in communication the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, the attitude unit 9500, the processor 9302, the storage 9304, the bus 9308, and the network interface 9310. The memory 9306 may be configured to be a computationally faster form of storing computer readable data and/or code than the storage 9304.

The memory 9306 may be adapted to store, read, write, receive, transmit, overwrite, delete, and/or save computer readable information that the storage 9304 carries and/or receives from the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, the attitude unit 9500, the processor 9302, the storage 9304, the bus 9308, and the network interface 9310. The memory 9306 may comprise, without limitation, non-volatile computer readable memory, volatile computer readable memory, random access memory (RAM), dynamic random access memory (DRAM), static random access memory (SRAM), hard drive storage, hard disk storage, floppy disk storage, magnetic tape storage, solid state storage, and/or any other type of device or component to be used as the memory 9306 as understood by those skilled in the art to store computer readable instructions, code, data, and/or information.

The bus 9308 may be in communication the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, the attitude unit 9500, the processor 9302, the storage 9304, the memory 9306, and the network interface 9310. The bus 9308 may be adapted to facilitate, control, regulate, and/or translate the communication of computer readable instructions, code, and/or data between the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, the attitude unit 9500, the processor 9302, the storage 9304, the memory 9306, and the network interface 9310. The bus 9308 may comprise, without limitation, an address bus, data bus, and/or a control bus.

The network interface 9310 may be in communication the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, the attitude unit 9500, the processor 9302, the storage 9304, the memory 9306, and the bus 9308. The network interface 9310 may be adapted to facilitate, control, regulate, and/or translate the communication of computer readable instructions, code, and/or data between the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the guidance unit 9400, the attitude unit 9500, the processor 9302, the storage 9304, the memory 9306, and the bus 9308.

Figure 13:
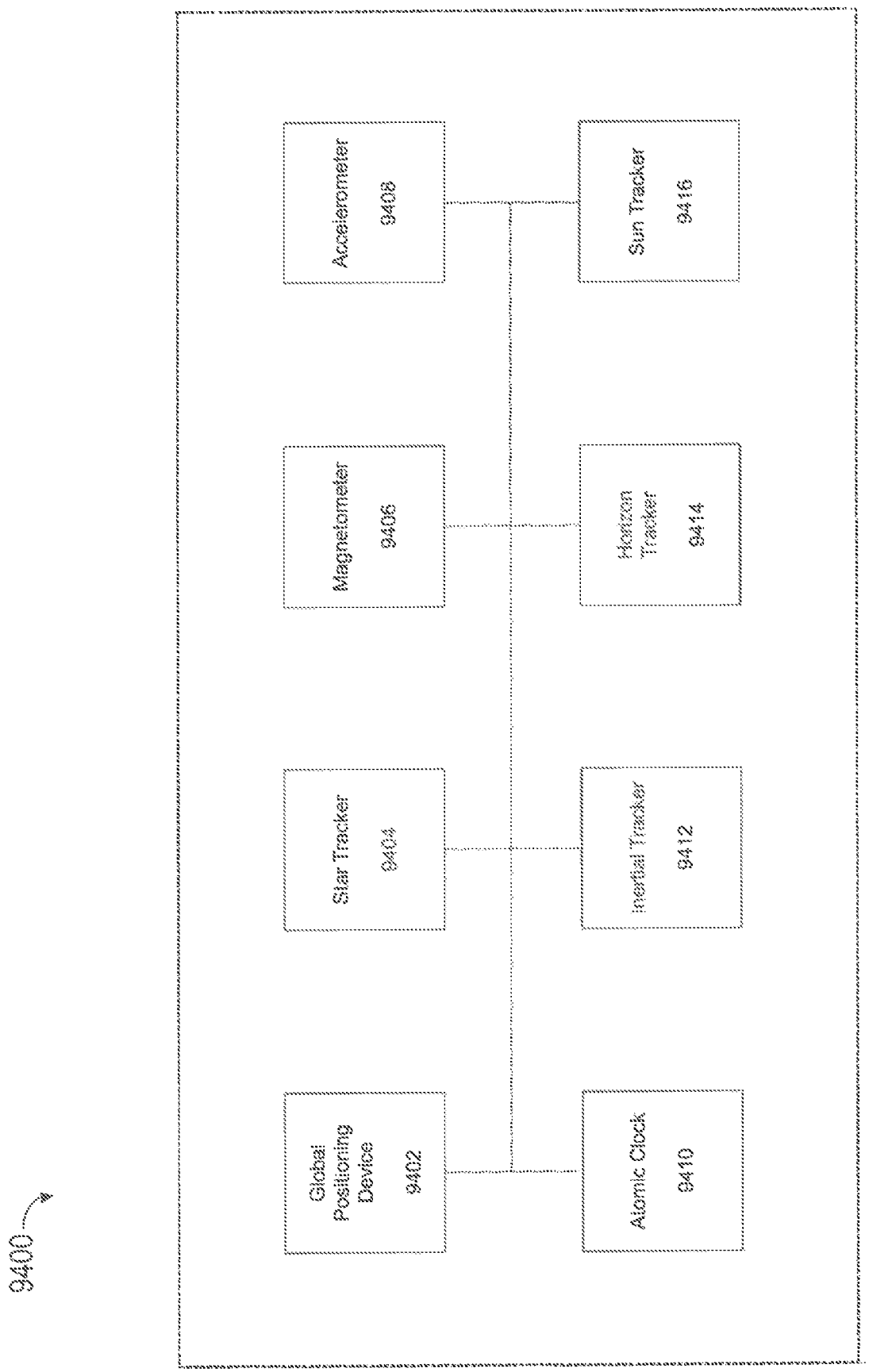
FIG. 13 is a schematic diagram of the guidance unit of the cube satellite space deployer system according to FIG. 8.

Continuing to refer to FIGS. 8-9, and additionally referring to FIG. 13, the guidance unit 9400 may be in communication with the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the control unit 9300, and the attitude unit 9500. The guidance unit 9400 may be adapted to sense, detect, compute, and/or track information about the position, movement, and/or location of the system 1000, and may emit a guidance signal regarding the position, movement, and/or location of the guidance unit 9400 and/or the system 1000.

The guidance unit 9400 may include a global positioning device 9402, a star tracker 9404, a magnetometer 9406, an accelerometer 9408, an atomic clock 9410, an inertial tracker 9412, a horizon tracker 9414, and a sun tracker 9416. The global positioning device 9402, the star tracker 9404, the magnetometer 9406, the accelerometer 9408, the atomic clock 9410, the inertial tracker 9412, the horizon tracker 9414, and the sun tracker 9416 may be in communication with the same devices, components, and/or members as recited for the guidance unit 9400 herein.

The global positioning device 9402 may be, without limitation, in communication with the star tracker 9404, the magnetometer 9406, the accelerometer 9408, the atomic clock 9410, the inertial tracker 9412, the horizon tracker 9414, and the sun tracker 9416. The global positioning device 9402 may be adapted to receive, sense, track, or otherwise obtain information or data about the position, velocity, acceleration, and/or location of the system 1000. The global positioning device 9402 may be configured to emit a global positioning signal regarding the position, movement, and/or location of the global positioning device 9402 and/or the system 1000.

The global positioning device 9402 may use and/or use data from global positioning satellites, base stations, the network 1012, and/or a communication device 1010 to receive, sense, track, or otherwise obtain information or data about the position, velocity, acceleration, and/or location of the global positioning device 9402 and/or the system 1000. The global positioning signal may be used by the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the control unit 9300, and/or the attitude unit 9500 to orient, direct, locate, and/or position the global positioning device 9402 and/or system 1000.

The star tracker 9404 may be, without limitation, in communication with the global positioning device 9402, the magnetometer 9406, the accelerometer 9408, the atomic clock 9410, the inertial tracker 9412, the horizon tracker 9414, and the sun tracker 9416. The star tracker 9404 may be adapted to sense, detect, track, and/or monitor the positions of stars. The star tracker may be configured to emit a star position signal regarding the position of the stars. The star tracker 9404 may comprise, without limitation, a photocell and/or a camera. The star position signal may be used by the attachment member 4002, the space arm assembly 1006, the cube satellite(s) 1008, the cube satellite housing(s) 1004, the housing cover 1014 of the cube satellite housing(s)

1004, the communication device 1010, the network 1012, the communication unit 9100, the power unit 9200, the control unit 9300, and/or the attitude unit 9500 to locate, orient and/or position the star tracker 9404 and/or the system 1000.

The magnetometer 9406 may be, without limitation, in communication with the global positioning device 9402, the star tracker 9404, the accelerometer 9408, the atomic clock 9410, the inertial tracker 9412, the horizon tracker 9414, and the sun tracker 9416. The magnetometer 9406 may be adapted to detect, sense, measure, monitor, and/or track magnetic fields and/or magnetic dipole moments. The magnetometer 9406 may be configured to emit a magnetometer signal regarding the magnetic fields and/or magnetic dipole moments monitored. The magnetometer signal may be used by the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the control unit 9300, and/or the attitude unit 9500 as a factor to consider when operating. For example, the magnetometer signal may be used as a factor to consider when launching the cube satellites 1008, operating housing cover(s) 1014 of the cube satellite housing(s) 1004, orienting the system 1000, and/or positioning the system 1000.

The accelerometer 9408 may be, without limitation, in communication with the global positioning device 9402, the magnetometer 9406, star tracker 9404, the atomic clock 9410, the inertial tracker 9412, the horizon tracker 9414, and the sun tracker 9416. The accelerometer 9408 may be adapted to sense, detect, track, record and/or monitor the acceleration of the system 1000. The accelerometer 9408 may be configured to emit an acceleration signal regarding the acceleration of the system 1000. The accelerometer 9408 may comprises, without limitation, a piezoelectric accelerometer, piezoresistance accelerometer, and/or a capacitive accelerometer.

The atomic clock 9410 may be, without limitation, in communication with the global positioning device 9402, the magnetometer 9406, the star tracker 9404, the accelerometer 9408, the inertial tracker 9412, the horizon tracker 9414, and the sun tracker 9416. The atomic clock 9410 may be adapted to measure time by monitoring the frequency of radiation given off by atoms. The atomic clock 9410 may comprise, without limitation, a cesium atomic clock, hydrogen atomic clock, and a rubidium atomic clock. The atomic clock 9410 may be configured to emit a time signal regarding the time measured by the atomic clock 9410.

The inertial tracker 9412 may be, without limitation, in communication with the global positioning device 9402, the magnetometer 9406, the star tracker 9404, the atomic clock 9410, the accelerometer 9408, the horizon tracker 9414, and the sun tracker 9416. The inertial tracker 9412 may be adapted and/or functional to sense, detect, track, monitor, and/or record the position and/or orientation of an object (not shown) and/or the system 1000 relative to a predetermined point, orientation, and/or velocity. The inertial tracker 9412 may be configured to emit an inertial track signal regarding the position and/or orientation of an object (not shown) and/or the system 1000 relative to a predetermined point, orientation, and/or velocity. The inertial tracker 9412 may use the acceleration signal emitted by the accelerometer 9408 for the operation and/or functions of the inertial tracker 9412. The inertial tracker 9412 may comprise a number of sensors and devices, for example, a gyroscope and accelerometer.

The horizon tracker 9414 may be, without limitation, in communication with the global positioning device 9402, the magnetometer 9406, star tracker 9404, the atomic clock 9410, the accelerometer 9408, the inertial tracker 9412, and the sun tracker 9416. The horizon tracker 9414 may be adapted to detect, sense, monitor, track, and/or record the horizon of Earth while the horizon tracker 9414 and/or the system 1000 is in the environment of space. The horizon tracker 9414 may also be adapted to detect and/or calculate the position of Earth's horizon relative to the position of the horizon tracker 9414 and/or the system 1000 while the system 1000 is in the orbit of space. The horizon tracker 9414 may be configured to emit a horizon signal that contains information about the position of the horizon tracker 9414 and/or the system 1000 relative to the horizon of Earth. The horizon tracker 9414 may comprise, without limitation, a bolometer, a mirror, and prism, a computation device, a spinning mirror, and a spinning prism.

The sun tracker 9416 may be, without limitation, in communication with the global positioning device 9402, the magnetometer 9406, the star tracker 9404, the atomic clock 9410, the accelerometer 9408, the inertial tracker 9412, and the horizon tracker 9414. The sun tracker 9416 may be adapted to detect, sense, monitor, track, and/or record the position of the Sun, to which the position of the Sun may then be calculated and/or compared to the relative position of the sun tracker 9416 and/or the system 1000. The sun tracker 9416 may be configured to emit a sun tracked signal pertaining to the position of the Sun and/or the relative position of the system 1000 and/or the sun tracker 9416 to the Sun. The sun tracker 9416 may comprise, without limitation, light sensors, infrared sensors, gamma radiation sensors, cameras, and/or photoelectric devices.

Figure 14:
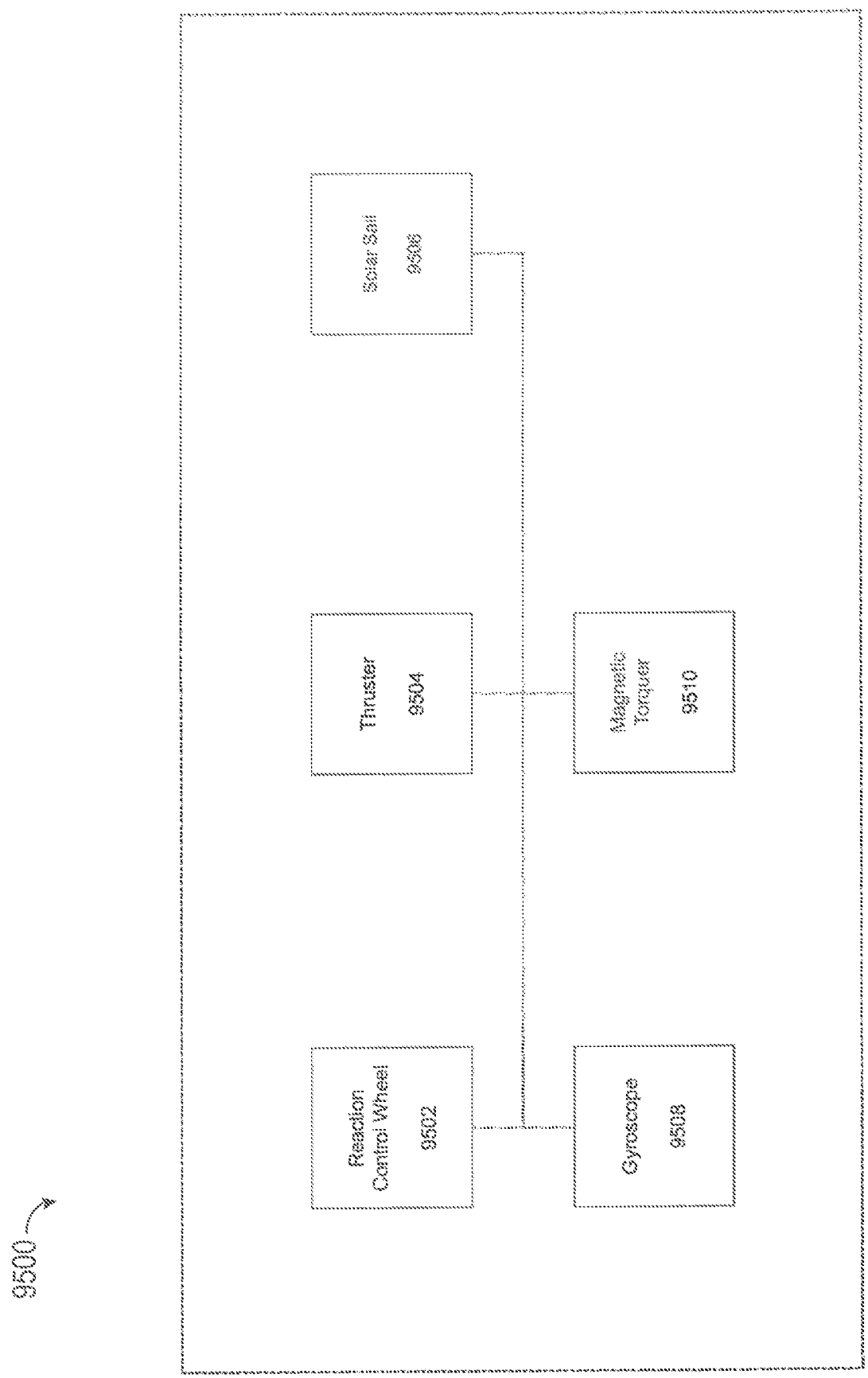
FIG. 14 is a schematic diagram of the attitude unit of the cube satellite space deployer system according to FIG. 8.

Continuing to refer to FIGS. 8-9, and additionally referring to FIG. 14, the attitude unit 9500 may be in communication with the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the control unit 9300, and the guidance unit 9400. The attitude unit 9500 may be adapted to produce, generate, emit, cause, and/or create a force applied upon the attitude unit 9500 and/or the system 1000.

The attitude unit 9500 may be configured to be controlled, operated, and/or managed by the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the control unit 9300, and the guidance unit 9400. The attitude unit 9500 may be used to move, orient, accelerate, decelerate, position, and/or maintain the position of an embodiment of the present invention. The attitude unit 9500 may include one or more of reaction control wheels 9502, thrusters 9504, solar sails 9506, gyroscopes 9508, and magnetic torquers 9510. The reaction control wheels 9502, thrusters 9504, solar sails 9506, gyroscopes 9508, and magnetic torquers 9510 may be in communication with the same devices, components, and/or members as recited for the attitude unit 9500 herein.

The reaction control wheel 9502 may be, without limitation, in communication with the thruster(s) 9502, the solar sail(s) 9506, the gyroscope(s) 9508, and the magnetic torquer(s) 9510. The reaction control wheel 9502 may be adapted to generate a torque that may provide for three-axis attitude control. The reaction control wheel 9502 may comprise, without limitation, an electric motor, a spinning wheel, a computation device, and/or any other device or component to be used for the reaction control wheel 9502 as understood by those skilled in the art to provide for attitude control. The reaction control wheel 9502 may be configured to operate autonomously or via automatic and/or manual inputs via the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the control unit 9300, and the guidance unit 9400.

Figure 5:
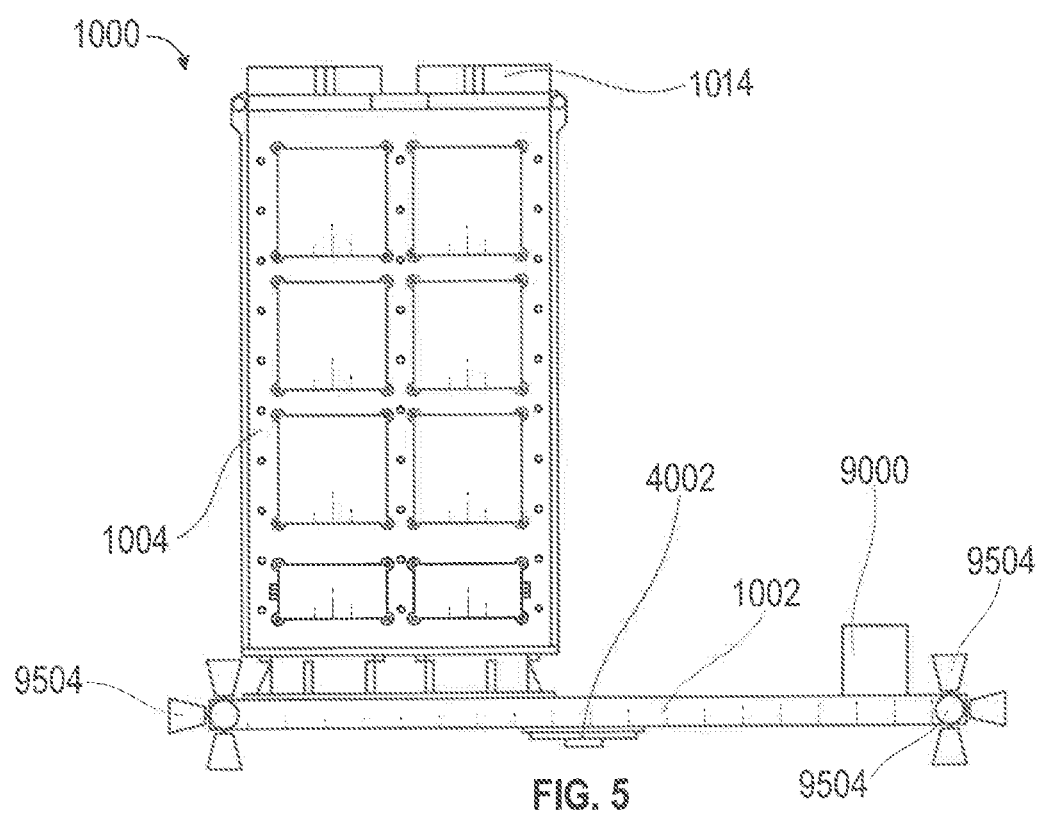
FIG. 5 is a side elevation view of the cube satellite space deployer system of FIG. 4, showing thrusters on the body plate and with the space arm assembly removed.
Figure 6:
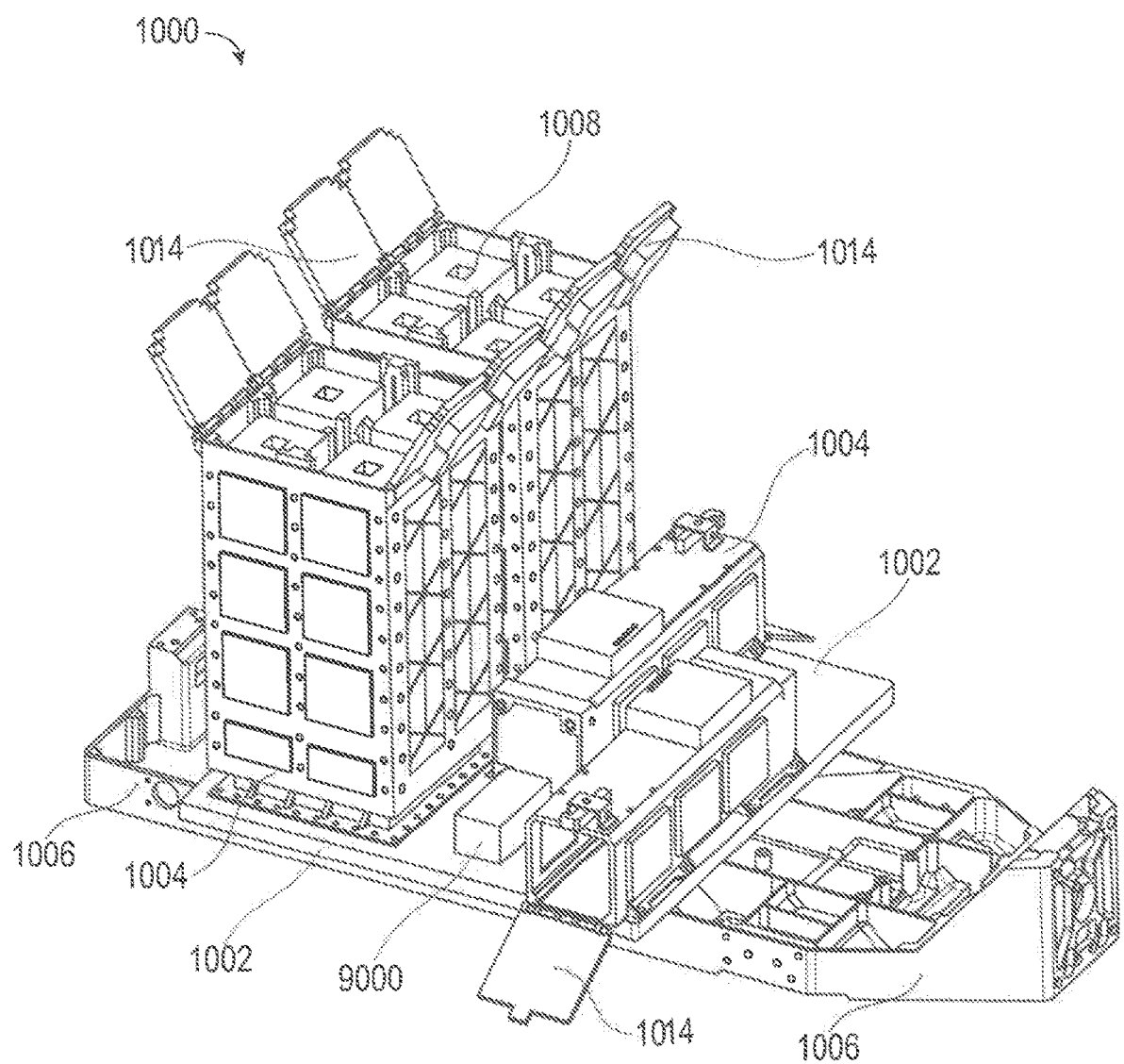
FIG. 6 is a perspective view of the cube satellite space deployer system of FIG. 3, showing different cube satellite housings attached to the body plate.

The thruster(s) 9504 may be, without limitation, in communication with the reaction control wheel(s) 9502, the solar sail(s) 9506, the gyroscope(s) 9508, and the magnetic torquer(s) 9510. The thrusters 9504 may be adapted to produce, generate, emit, cause, and/or create a force to be applied upon the thrusters 9504 and/or the system 1000. The thrusters 9504 may be configured to be controlled, operated, and/or managed autonomously or by the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the control unit 9300, and the guidance unit 9400. As best illustrated in FIG. 5, the thrusters 9504 may be attached to various surfaces of the body plate 1002. Preferably, the thrusters 9504 are attached to outer areas of the body plate 1002 on surfaces thereon that are at or near a perimeter of the body plate 1002.

The thrusters 9504 may comprise, without limitation, cold gas thrusters, electrohydrodynamic thruster, electrodeless plasma thruster, electrostatic ion thruster, hall effect thruster, ion thruster, magnetoplasmadynamic thruster, pulsed inductive thruster, pulsed plasma thruster, radio-frequency resonant cavity thruster, and/or a rocket engine thruster. For thrusters 9504 that consume a fuel to generate the thrust, the fuel may be carried by the thrusters 9504 and/or source from and/or carried by the power unit 9200, specifically the fuel may be carried by the power storage unit 9202 of the power unit 9200.

The solar sail(s) 9506 may be, without limitation, in communication with the reaction control wheel(s) 9502, the thruster(s) 9504, the gyroscope(s) 9508, and the magnetic torquer(s) 9510. The solar sails 9506 may be adapted to generate a force by using wavelengths of light. More specifically, the solar sails 9506 may use solar photons in a similar manner that sails use wind to create a force by reflecting photons off of the solar sail 9506. The solar sails 9506 may be adapted to be deployed from the housing of the electronic members 9000. The solar sails 9506 may be configured to be controlled, operated, and/or managed autonomously or by the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the control unit 9300, and the guidance unit 9400.

The gyroscope 9508 may be, without limitation, in communication with the reaction control wheel(s) 9502, the thruster(s) 9504, the solar sail(s) 9506, and the magnetic torquer(s) 9510. The gyroscope 9508 may be adapted to measure and/or maintain the orientation and angular velocity of an embodiment of the present invention. The gyroscope 9508 may be configured to be controlled, operated, and/or managed autonomously or by the body plate 1002, the attachment member 4002, the space arm assembly 1006, the cube satellite(s) 1008, the cube satellite housing(s) 1004, the housing cover 1014 of the cube satellite housing(s) 1004, the communication device 1010, the network 1012, the communication unit 9100, the power unit 9200, the control unit 9300, and the guidance unit 9400. The gyroscope 9508 may comprise, without limitation, a rotary gyroscope, a vibrating structure gyroscope, and/or an optical gyroscope.

The magnetic torquer 9510 may be, without limitation, in communication with the reaction control wheel(s) 9502, the thruster(s) 9504, the solar sail(s) 9506, and the gyroscope(s) 9508. The magnetic torquer 9510 may be adapted to create a magnetic dipole that may interface with an ambient magnetic field, which may be Earth's ambient magnetic field, to produce torque acted upon the magnetic torquer 9510 and/or the system 1000. The magnetic torquer 9510 may be configured to be controlled, operated, and/or managed autonomously or by the body plate 1002, the attachment member 4002, the space arm assembly 1006, the cube satellite(s) 1008, the cube satellite housing(s) 1004, housing cover 1014 of the cube satellite housing(s) 1004, the communication device 1010, the network 1012, the communication unit 9100, the power unit 9200, the control unit 9300, and the guidance unit 9400. The magnetic torquer 9510 may be used to stabilize, detumble, and/or control the attitude of an embodiment of the present invention. The magnetic torquer 9510 may comprise, without limitation, an air-core magnetorquer, an embedded coil magnetorquer, and/or a torque-rod magnetorquer.

Now referring to FIGS. 1 and 8, there may be several approaches or methods for using a cube satellite deployer system 1000, and some embodiments are described below. An embodiment of the present invention may include a body plate 1002, a space arm assembly 1006, a communication unit 9100, a power unit 9200, and a control unit 9300. The body plate 1002 may be adapted to be removably connected to the space arm assembly 1006. The communication unit 9100 may be attached to the body plate 1002. The power unit 9200 may be in communication with the communication unit 9100, and the power unit 9200 may be attached to the body plate 1002. The control unit 9300 may be in communication with the communication unit 9100 and/or the power unit 9200.

A first embodiment may include attaching at least one cube satellite housing 1004 to the body plate 1002. The cube satellite housing(s) 1004 may be adapted to house at least one cube satellite 1008. The cube satellite housing(s) 1004 may also be positioned in communication with the communication unit 9100, the power unit 9200, and/or the control unit 9300. This first embodiment may include connecting the body plate 1002 to a space arm assembly 1006, and/or may include deploying the at least one cube satellite 1008 into space from the cube satellite housing(s) 1004 when the cube satellite housing(s) 1004 are connected to the body plate 1002.

Another embodiment may include the body plate 1002 being deployable from the space arm assembly 1006. The body plate 1002 may be adapted to propel and orient itself upon deployment from the space arm assembly 1006, and the body plate 1002 may be further adapted to be reattached to the space arm assembly 1006. For example, without limitation, the system 1000 and/or the body plate 1002 may be deployed from the space arm assembly 1006 and propel and orient itself to a predetermined or desired position and/or orientation so that one or more cube satellites 1008 may be launched from one of the cube satellite housings 1004, and so that the launched cube satellites 1008 are placed and/or launched, at or on, the desired position or path of orbit.

Another embodiment may include deploying at least one cube satellite 1008 into space by deploying the cube satellite 1008 into space using a propellant, a spring, an electromagnet, a roller, a pneumatic device, a robotic arm, a hydraulic device, a pressurized medium, a pulley, and/or a kinetic pusher.

Now additionally referring to FIG. 11, another embodiment may include the power unit 9200 comprising at least one of a power storage unit 9202, a power generation unit 9204, and a power connection adapter 9206. The power connection adapter 9206 may be in communication with the space arm assembly 1006. The power unit 9200 may also comprise at least one of a battery 9210, a photovoltaic member 9208, and a fuel consuming generator 9212.

Now referring to FIGS. 1, 8, 13, and 14, another embodiment may include a guidance unit 9400 and/or at least one attitude unit 9500 that may be attached to the body plate 1002. The guidance unit 9400 and/or the attitude unit(s) 9500 may be in communication with the communication unit 9100, the power unit 9200, and/or the control unit 9300. In another embodiment, the guidance unit 9400 may include a global positioning device 9402, a star tracker 9404, a magnetometer 9406, an accelerometer 9408, an atomic clock 9410, an inertial tracker 9412, a horizon tracker 9414, and/or a sun tracker 9416. In another embodiment, the attitude unit 9500 may comprise a reaction control wheel 9502, a thruster 9504, a solar sail 9506, a gyroscope 9508, and/or a magnetic torquer 9510. In another embodiment, the cube satellite(s) 1008 may is sized between 3 U to 12 U.

Now additionally referring to FIG. 10, in another embodiment, communication unit 9100 may comprise a radio device 9102, an antenna 9104, a communication dish 9106, a transmitter 9108, a receiver 9110, and/or a transceiver 9112. There may also be an embodiment that includes reattaching the body plate 1002 to the space arm assembly 1006.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A cube satellite deployer system comprising:
    a body plate adapted to be connected to a space arm assembly;
    a communication unit attached to the body plate;
    a power unit in communication with the communication unit and attached to the body plate;
    a control unit in communication with each of the communication unit and the power unit; and
    an attachment member located on a mid-area of a lower facing portion of the body plate to connect the body plate to the space arm assembly;
    wherein the body plate is adapted to receive at least one cube satellite housing that is adapted to house and selectively launch at least one cube satellite;
    wherein the attachment member is removably attachable to the space arm assembly; and
    wherein the at least one cube satellite is selectively launchable from the at least one cube satellite housing via at least one of an electromagnet, a roller, a robotic arm, a hydraulic device, and a pulley.

2. The system of claim 1 wherein the at least one cube satellite housing is connectable to the body plate; and wherein the at least one cube satellite housing is in communication with at least one of the communication unit, the power unit, and the control unit.

3. The system of claim 1, wherein the power unit further comprises at least one of a power storage unit, a power generation unit, and a power connection adapter; and wherein the power connection adapter is in communication with the space arm assembly.

4. The system of claim 1, wherein the power unit comprises at least one of a battery, a photovoltaic member, and a fuel consuming generator.

5. The system of claim 1, wherein the plurality of cube satellites are sized between 3 U to 12 U.

6. The system of claim 1, wherein the communication unit comprises of at least one of a radio device, an antenna, a communication dish, a transmitter, a receiver, and a transceiver.

7. The system of claim 1, further comprising a guidance unit attached to the body plate; and wherein the guidance unit is in communication with at least one of the communication unit, the power unit, and the control unit.

8. The system of claim 7, wherein the guidance unit comprises at least one of a global positioning device, a star tracker, a magnetometer, an accelerometer, an atomic clock, an inertial tracker, a horizon tracker, and a sun tracker.

9. The system of claim 1, wherein the communication unit is in communication with a communication device.

10. The system of claim 9, wherein the communication unit is in communication with the communication device via a network.

11. The system of claim 1, further comprising at least one attitude unit attached to the body plate; and wherein the at least one attitude unit is in communication with at least one of the communication unit, the control unit, and the power unit.

12. The system of claim 11, wherein the at least one attitude unit comprises at least one of a reaction control wheel, a thruster, a solar sail, a gyroscope, and a magnetic torquer.

13. A cube satellite deployer system comprising:
a body plate adapted to be removably attached to a space arm assembly;
an attachment member located on a mid-area of a lower facing portion of the body plate to attach the body plate to the space arm assembly;
a communication unit attached to the body plate;
a power unit in communication with the communication unit, and attached to the body plate;
a control unit in communication with each of the communication unit and the power unit;
at least one attitude unit attached to the body plate, and in communication with at least one of the communication unit, the power unit, and the control unit; and
a guidance unit attached to the body plate, and in communication with at least one of the communication unit, the power unit, and the control unit;
wherein the body plate is adapted to receive at least one cube satellite housing that is adapted to house and selectively launch at least one cube satellite;
wherein the attachment member is removably attachable to the space arm assembly so that the body plate can be deployed from the space arm assembly and propel and orient itself and so that the body plate can be reattached to the space arm assembly; and
wherein the at least one cube satellite is selectively launchable from the at least one cube satellite housing via at least one of an electromagnet, a roller, a robotic arm, a hydraulic device, and a pulley.

14. The system of claim 13, wherein the at least one cube satellite housing is connectable to the body plate; and wherein the at least one cube satellite housing is in communication with at least one of the communication unit, the power unit, and the control unit.

15. The system of claim 13, wherein the power unit further comprises at least one of a power storage unit, a power generation unit, and a power connection adapter; and wherein the power connection adapter is in communication with the space arm assembly.

16. The system of claim 13, wherein the power unit comprises at least one of a battery, a photovoltaic member, and a fuel consuming generator.

17. The system of claim 13, wherein the guidance unit comprises at least one of a global positioning device, a star tracker, a magnetometer, an accelerometer, an atomic clock, an inertial tracker, a horizon tracker, and a sun tracker.

18. The system of claim 13, wherein the plurality of cube satellites are sized between 3 U to 12 U.

19. The system of claim 13, wherein the communication unit is in communication with a communication device via a network; and wherein the communication unit comprises of at least one of a radio device, an antenna, a communication dish, a transmitter, a receiver, and a transceiver.

20. The system of claim 13, wherein the at least one attitude unit comprises at least one of a reaction control wheel, a thruster, a solar sail, a gyroscope, and a magnetic torquer.

21. A cube satellite deployer system comprising:
a body plate that is removably connected to a space arm assembly;
an attachment member located on a mid-area of a lower facing portion of the body plate to removably connect the body plate to the space arm assembly;
a communication unit attached to the body plate;
a power unit in communication with the communication unit, and attached to the body plate;
a control unit in communication with each of the communication unit and the power unit;
at least one attitude unit attached to the body plate, and in communication with at least one of the communication unit, the power unit, and the control unit; and
a guidance unit attached to the body plate, and in communication with at least one of the communication unit, the power unit, and the control unit;
wherein the body plate is adapted to receive at least one cube satellite housing that is adapted to house and selectively launch at least one cube satellite;
wherein the attachment member is adapted to be removably attachable to the space arm assembly;
wherein the body plate is deployable from the space arm assembly;
wherein the body plate is adapted to propel and orient itself upon deployment from the space arm assembly;
wherein the attachment member is adapted to be reattached to the space arm assembly to reattach the body plate to the space arm assembly; and
wherein the at least one cube satellite is selectively launchable from the at least one cube satellite housing via at least one of an electromagnet, a roller, a robotic arm, a hydraulic device, and a pulley.

22. The system of claim 21, wherein the at least one cube satellite housing is connectable to the body plate; and wherein the at least one cube satellite housing is in communication with at least one of the communication unit, the power unit, and the control unit.

23. The system of claim 21, wherein the power unit further comprises at least one of a power storage unit, a power generation unit, and a power connection adapter; and wherein the power connection adapter is in communication with the space arm assembly.

24. The system of claim 21, wherein the power unit comprises at least one of a battery, a photovoltaic member, and a fuel consuming generator.

25. The system of claim 21, wherein the guidance unit comprises at least one of a global positioning device, a star tracker, a magnetometer, an accelerometer, an atomic clock, an inertial tracker, a horizon tracker, and a sun tracker.

26. The system of claim 21, wherein the plurality of cube satellites are sized between 3 U to 12 U.

27. The system of claim 21, wherein the communication unit is in communication with a communication device via a network; and wherein the communication unit comprises of at least one of a radio device, an antenna, a communication dish, a transmitter, a receiver, and a transceiver.

28. The system of claim 21, wherein the at least one attitude unit comprises at least one of a reaction control wheel, a thruster, a solar sail, a gyroscope, and a magnetic torquer.

29. A method for using a cube satellite deployer system, the cube satellite deployer system comprising a body plate adapted to be removably connected to a space arm assembly, an attachment member located on a mid-area of a lower facing portion of the body plate to removably connect the body plate to the space arm assembly, a communication unit attached to the body plate, a power unit in communication with the communication unit and attached to the body plate, and a control unit in communication with each of the communication unit and the power unit, the method comprising:

attaching at least one cube satellite housing to the body plate, the at least one cube satellite housing adapted to house at least one cube satellite and being positioned in communication with at least one of the communication unit, the power unit, and the control unit;

connecting the body plate to the space arm assembly via the attachment member; and deploying the at least one cube satellite into space from the at least one cube satellite housing using at least one of an electromagnet, a roller, a robotic arm, a hydraulic device, and a pulley when the cube satellite housing is connected to the body plate;

wherein the attachment member is adapted to be removably attached to the space arm assembly;

wherein the body plate is deployable from the space arm assembly;

wherein the body plate is adapted to propel and orient itself upon deployment from the space arm assembly; and wherein the attachment member is adapted to be reattached to the space arm assembly to reattach the body plate to the space arm assembly.

30. The method of claim 29, wherein the power unit comprises at least one of a power storage unit, a power generation unit, and a power connection adapter; and wherein the power connection adapter is in communication with the space arm assembly; and wherein the power unit comprises at least one of a battery, a photovoltaic member, and a fuel consuming generator.

31. The method of claim 29, wherein the at least one cube satellite is sized between 3 U to 12 U.

32. The method of claim 29, wherein the communication unit comprises of at least one of a radio device, an antenna, a communication dish, a transmitter, a receiver, and a transceiver.

33. The method of claim 29, further comprising reattaching the body plate to the space arm assembly.

34. The method of claim 29, wherein a guidance unit and at least one attitude unit that are attached to the body plate; and wherein the guidance unit and the at least one attitude unit are in communication with at least one of the communication unit, the power unit, and the control unit.

35. The method of claim 34, wherein the guidance unit comprises at least one of a global positioning device, a star tracker, a magnetometer, an accelerometer, an atomic clock, an inertial tracker, a horizon tracker, and a sun tracker.

36. The method of claim 34, wherein the at least one attitude unit comprises at least one of a reaction control wheel, a thruster, a solar sail, a gyroscope, and a magnetic torquer.

* * * * *